(12) United States Patent
Anand et al.

(10) Patent No.: US 12,111,646 B2
(45) Date of Patent: Oct. 8, 2024

(54) ROBOTIC PROCESS AUTOMATION WITH RESILIENT PLAYBACK OF RECORDINGS

(71) Applicant: Automation Anywhere, Inc., San Jose, CA (US)

(72) Inventors: Virinchipuram Anand, San Ramon, CA (US); Sudhir Kumar Singh, Dublin, CA (US); Harshil Lodhiya, Vadodara (IN)

(73) Assignee: Automation Anywhere, Inc., San Jose, CA (US)

( * ) Notice: Subject to any disclaimer, the term of this patent is extended or adjusted under 35 U.S.C. 154(b) by 615 days.

(21) Appl. No.: 17/206,029

(22) Filed: Mar. 18, 2021

(65) Prior Publication Data
US 2022/0032457 A1 Feb. 3, 2022

Related U.S. Application Data

(60) Provisional application No. 63/139,757, filed on Jan. 20, 2021, provisional application No. 63/060,541, filed on Aug. 3, 2020.

(51) Int. Cl.
*G05B 19/423* (2006.01)
*G06F 3/00* (2006.01)
(Continued)

(52) U.S. Cl.
CPC ............ *G05B 19/423* (2013.01); *G06F 3/00* (2013.01); *G06F 9/451* (2018.02); *G06F 11/34* (2013.01);
(Continued)

(58) Field of Classification Search
CPC .. G06F 11/34; G06F 11/3414; G06F 11/3438; G06F 11/3664; G06F 11/3668;
(Continued)

(56) References Cited

U.S. PATENT DOCUMENTS 5,949,999 A 9/1999 Song et al.
5,983,001 A 11/1999 Boughner et al.
(Continued)

FOREIGN PATENT DOCUMENTS

WO 2019/092672 A2 5/2019
WO 2022/076488 4/2022

OTHER PUBLICATIONS

Final Office Action for U.S. Appl. No. 17/139,842, mailed Dec. 29, 2023.
(Continued)

*Primary Examiner* — Daniel Samwel

(57) ABSTRACT

Robotic process automation (RPA) systems with improved playback capabilities are disclosed. Certain embodiments can provide resilient playback of software automation processes by providing enhanced capabilities to locate user interface controls within a screen image of a user interface of an application program being utilized by the software automation processes. Using such capabilities, embodiments can provide resilient playback of software automation processes by providing the capability to resolve playback errors by detecting user interface controls within at least one screen image of a user interface that was captured when the software automation process was created. Advantageously, embodiments disclosed herein allow software automation processes to continue to operate over time and thus with greater resiliency and flexibility.

20 Claims, 16 Drawing Sheets

(51) Int. Cl.
*G06F 9/451* (2018.01)
*G06F 11/34* (2006.01)

(52) U.S. Cl.
CPC ...... *G06F 11/3414* (2013.01); *G06F 11/3438* (2013.01)

(58) Field of Classification Search
CPC ............... G06F 11/3672; G06F 11/368; G06F 11/3684; G06F 11/3696; G06F 11/3612; G06F 9/451; G06F 3/00; G05B 19/423
See application file for complete search history.

(56) References Cited

U.S. PATENT DOCUMENTS

| | | | |
|---|---|---|---|
| 6,133,917 A | 10/2000 | Feigner et al. |
| 6,226,407 B1 | 5/2001 | Zabih et al. |
| 6,389,592 B1 | 5/2002 | Ayres et al. |
| 6,427,234 B1 | 5/2002 | Chambers et al. |
| 6,473,794 B1 | 10/2002 | Guheen et al. |
| 6,496,979 B1 | 12/2002 | Chen et al. |
| 6,640,244 B1 | 10/2003 | Bowman-Amuah |
| 6,704,873 B1 | 3/2004 | Underwood |
| 6,898,764 B2 | 5/2005 | Kemp |
| 6,954,747 B1 | 10/2005 | Wang et al. |
| 6,957,186 B1 | 10/2005 | Guheen et al. |
| 7,091,898 B2 | 8/2006 | Arling et al. |
| 7,246,128 B2 | 7/2007 | Jordahl |
| 7,398,469 B2 | 7/2008 | Kisamore et al. |
| 7,441,007 B1 | 10/2008 | Kirkpatrick et al. |
| 7,533,096 B2 | 5/2009 | Rice et al. |
| 7,568,109 B2 | 7/2009 | Powell et al. |
| 7,571,427 B2 | 8/2009 | Wang et al. |
| 7,765,525 B1 | 7/2010 | Davidson et al. |
| 7,783,135 B2 | 8/2010 | Gokturk |
| 7,805,317 B2 | 9/2010 | Khan et al. |
| 7,805,710 B2 | 9/2010 | North |
| 7,810,070 B2 | 10/2010 | Nasuti et al. |
| 7,846,023 B2 | 12/2010 | Evans et al. |
| 8,028,269 B2 | 9/2011 | Bhatia et al. |
| 8,056,092 B2 | 11/2011 | Allen et al. |
| 8,095,910 B2 | 1/2012 | Nathan et al. |
| 8,132,156 B2 | 3/2012 | Malcolm |
| 8,209,738 B2 | 6/2012 | Nicol et al. |
| 8,234,622 B2 | 7/2012 | Meijer et al. |
| 8,245,215 B2 | 8/2012 | Extra |
| 8,352,464 B2 | 1/2013 | Fotev |
| 8,365,147 B2 | 1/2013 | Grechanik |
| 8,396,890 B2 | 3/2013 | Lim |
| 8,438,558 B1 | 5/2013 | Adams |
| 8,443,291 B2 | 5/2013 | Ku et al. |
| 8,464,240 B2 | 6/2013 | Fritsch et al. |
| 8,498,473 B2 | 7/2013 | Chong et al. |
| 8,504,803 B2 | 8/2013 | Shukla |
| 8,631,458 B1 | 1/2014 | Banerjee |
| 8,682,083 B2 | 3/2014 | Kumar et al. |
| 8,713,003 B2 | 4/2014 | Fotev |
| 8,724,907 B1 | 5/2014 | Sampson et al. |
| 8,769,482 B2 | 7/2014 | Batey et al. |
| 8,819,241 B1 | 8/2014 | Washburn |
| 8,832,048 B2 | 9/2014 | Lim |
| 8,874,685 B1 | 10/2014 | Hollis et al. |
| 8,943,493 B2 | 1/2015 | Schneider |
| 8,965,905 B2 | 2/2015 | Ashmore et al. |
| 8,966,458 B2 | 2/2015 | Asai |
| 9,032,314 B2 | 5/2015 | Mital et al. |
| 9,104,294 B2 | 8/2015 | Forstall et al. |
| 9,171,359 B1 | 10/2015 | Lund |
| 9,213,625 B1 | 12/2015 | Schrage |
| 9,251,413 B2 | 2/2016 | Meler |
| 9,278,284 B2 | 3/2016 | Ruppert et al. |
| 9,444,844 B2 | 9/2016 | Edery et al. |
| 9,462,042 B2 | 10/2016 | Shukla et al. |
| 9,571,332 B2 | 2/2017 | Subramaniam et al. |
| 9,600,519 B2 | 3/2017 | Schoning et al. |
| 9,621,584 B1 | 4/2017 | Schmidt et al. |
| 9,934,063 B2 | 4/2018 | Kania |
| 9,934,129 B1 | 4/2018 | Budurean |
| 9,946,233 B2 | 4/2018 | Brun et al. |
| 9,965,139 B2 | 5/2018 | Nychis |
| 9,990,347 B2 | 6/2018 | Raskovic et al. |
| 10,015,503 B1 | 7/2018 | Ahammad |
| 10,043,255 B1 | 8/2018 | Pathapati et al. |
| 10,282,280 B1 | 5/2019 | Gouskova |
| 10,489,682 B1 | 11/2019 | Kumar et al. |
| 10,552,540 B2 | 2/2020 | Marascu et al. |
| 10,592,738 B2 | 3/2020 | Northrup |
| 10,654,166 B1 | 5/2020 | Hall |
| 10,706,218 B2 | 7/2020 | Milward et al. |
| 10,706,228 B2 | 7/2020 | Buisson |
| 10,713,068 B1 | 7/2020 | Zohar |
| 10,936,807 B1 | 3/2021 | Walters |
| 10,970,109 B1 | 4/2021 | Berenstein |
| 11,099,972 B2 | 8/2021 | Puszkiewicz |
| 11,176,443 B1 | 11/2021 | Selva |
| 11,182,178 B1 | 11/2021 | Singh et al. |
| 11,182,604 B1 | 11/2021 | Methaniya |
| 11,243,803 B2 | 2/2022 | Anand et al. |
| 11,263,391 B2 | 3/2022 | Potts |
| 11,348,353 B2 | 5/2022 | Sundell et al. |
| 11,614,731 B2 | 3/2023 | Anand et al. |
| 11,642,783 B2 | 5/2023 | Han et al. |
| 11,775,321 B2 | 10/2023 | Singh et al. |
| 11,775,339 B2 | 10/2023 | Anand et al. |
| 11,775,814 B1 | 10/2023 | Anand et al. |
| 11,782,734 B2 | 10/2023 | Ginoya et al. |
| 11,820,020 B2 | 11/2023 | Goyal et al. |
| 2002/0029232 A1 | 3/2002 | Bobrow et al. |
| 2003/0033590 A1 | 2/2003 | Leherbauer |
| 2003/0101245 A1 | 5/2003 | Srinivasan et al. |
| 2003/0110382 A1 | 6/2003 | Leporini |
| 2003/0114959 A1 | 6/2003 | Sakamoto |
| 2003/0159089 A1 | 8/2003 | DiJoseph |
| 2004/0083472 A1 | 4/2004 | Rao et al. |
| 2004/0153649 A1 | 8/2004 | Rhoads |
| 2004/0172526 A1 | 9/2004 | Tann et al. |
| 2004/0210885 A1 | 10/2004 | Wang et al. |
| 2004/0243994 A1 | 12/2004 | Nasu |
| 2005/0188357 A1 | 8/2005 | Derks et al. |
| 2005/0204343 A1 | 9/2005 | Kisamore et al. |
| 2005/0257214 A1 | 11/2005 | Moshir et al. |
| 2006/0095276 A1 | 5/2006 | Axelrod et al. |
| 2006/0150188 A1 | 7/2006 | Roman et al. |
| 2006/0218110 A1 | 9/2006 | Simske et al. |
| 2007/0030528 A1 | 2/2007 | Quaeler et al. |
| 2007/0089101 A1 | 4/2007 | Romanovskiy |
| 2007/0101291 A1 | 5/2007 | Forstall et al. |
| 2007/0112574 A1 | 5/2007 | Greene |
| 2007/0156677 A1 | 7/2007 | Szabo |
| 2007/0233741 A1 | 10/2007 | Shen |
| 2008/0005086 A1 | 1/2008 | Moore |
| 2008/0027769 A1 | 1/2008 | Eder |
| 2008/0028392 A1 | 1/2008 | Chen et al. |
| 2008/0133052 A1 | 6/2008 | Jones |
| 2008/0209392 A1 | 8/2008 | Able et al. |
| 2008/0222454 A1 | 9/2008 | Kelso |
| 2008/0263024 A1 | 10/2008 | Landschaft et al. |
| 2008/0310625 A1 | 12/2008 | Vanstone |
| 2009/0037509 A1 | 2/2009 | Parekh et al. |
| 2009/0103769 A1 | 4/2009 | Milov et al. |
| 2009/0116071 A1 | 5/2009 | Mantell |
| 2009/0172814 A1 | 7/2009 | Khosravi et al. |
| 2009/0199160 A1 | 8/2009 | Vaitheeswaran et al. |
| 2009/0217309 A1 | 8/2009 | Grechanik et al. |
| 2009/0249297 A1 | 10/2009 | Doshi et al. |
| 2009/0313229 A1 | 12/2009 | Fellenstein et al. |
| 2009/0320002 A1 | 12/2009 | Peri-Glass et al. |
| 2010/0023602 A1 | 1/2010 | Martone |
| 2010/0023933 A1 | 1/2010 | Bryant et al. |
| 2010/0077475 A1 | 3/2010 | Deschenes |
| 2010/0100605 A1 | 4/2010 | Allen et al. |
| 2010/0106671 A1 | 4/2010 | Li et al. |
| 2010/0138015 A1 | 6/2010 | Colombo et al. |
| 2010/0235433 A1 | 9/2010 | Ansari et al. |

(56) References Cited

U.S. PATENT DOCUMENTS

| | | |
|---|---|---|
| 2010/0251163 A1 | 9/2010 | Keable |
| 2010/0275113 A1 | 10/2010 | Santos |
| 2011/0022578 A1 | 1/2011 | Fotev |
| 2011/0106284 A1 | 5/2011 | Catoen |
| 2011/0145807 A1 | 6/2011 | Molinie et al. |
| 2011/0197121 A1 | 8/2011 | Kletter |
| 2011/0258550 A1 | 10/2011 | Dinh-Trong |
| 2011/0267490 A1 | 11/2011 | Goktekin |
| 2011/0276568 A1 | 11/2011 | Fotev |
| 2011/0276946 A1 | 11/2011 | Pletter |
| 2011/0302570 A1 | 12/2011 | Kurimilla et al. |
| 2012/0011458 A1 | 1/2012 | Xia et al. |
| 2012/0042281 A1 | 2/2012 | Green |
| 2012/0124062 A1 | 5/2012 | Macbeth et al. |
| 2012/0131456 A1 | 5/2012 | Lin et al. |
| 2012/0143941 A1 | 6/2012 | Kim |
| 2012/0266149 A1 | 10/2012 | Lebert |
| 2012/0324333 A1 | 12/2012 | Lehavi |
| 2012/0330940 A1 | 12/2012 | Caire et al. |
| 2013/0145006 A1 | 6/2013 | Tammam |
| 2013/0173648 A1 | 7/2013 | Tan et al. |
| 2013/0227535 A1 | 8/2013 | Kannan |
| 2013/0236111 A1 | 9/2013 | Pintsov |
| 2013/0290318 A1 | 10/2013 | Shapira et al. |
| 2013/0332511 A1 | 12/2013 | Hala |
| 2013/0332524 A1 | 12/2013 | Fiala |
| 2014/0036290 A1 | 2/2014 | Miyagawa |
| 2014/0045484 A1 | 2/2014 | Kim et al. |
| 2014/0075371 A1 | 3/2014 | Carmi |
| 2014/0181705 A1 | 6/2014 | Hey et al. |
| 2014/0189576 A1 | 7/2014 | Carmi |
| 2014/0379666 A1 | 12/2014 | Bryon |
| 2015/0082280 A1 | 3/2015 | Betak et al. |
| 2015/0235193 A1 | 8/2015 | Cummings |
| 2015/0290795 A1 | 10/2015 | Oleynik |
| 2015/0310268 A1 | 10/2015 | He |
| 2015/0347284 A1 | 12/2015 | Hey et al. |
| 2016/0019049 A1 | 1/2016 | Kakhandiki et al. |
| 2016/0034441 A1 | 2/2016 | Nguyen et al. |
| 2016/0055376 A1 | 2/2016 | Koduru |
| 2016/0063269 A1 | 3/2016 | Liden |
| 2016/0078368 A1 | 3/2016 | Kakhandiki et al. |
| 2017/0270431 A1 | 9/2017 | Hosabettu |
| 2017/0352041 A1 | 12/2017 | Ramamurthy |
| 2018/0113781 A1 | 4/2018 | Kim |
| 2018/0210824 A1 | 7/2018 | Kochura |
| 2018/0218429 A1 | 8/2018 | Guo et al. |
| 2018/0275835 A1 | 9/2018 | Prag |
| 2018/0276462 A1 | 9/2018 | Davis |
| 2018/0321955 A1 | 11/2018 | Liu |
| 2018/0322403 A1 | 11/2018 | Ron |
| 2018/0349730 A1 | 12/2018 | Dixon |
| 2018/0370029 A1* | 12/2018 | Hall .................... G06F 11/0715 |
| 2019/0005050 A1 | 1/2019 | Proux |
| 2019/0026215 A1* | 1/2019 | Agarwal ............. G06F 11/3672 |
| 2019/0028587 A1 | 1/2019 | Unitt |
| 2019/0034041 A1 | 1/2019 | Nychis |
| 2019/0095440 A1 | 3/2019 | Chakra |
| 2019/0114370 A1 | 4/2019 | Cerino |
| 2019/0126463 A1 | 5/2019 | Purushothaman |
| 2019/0141596 A1 | 5/2019 | Gay |
| 2019/0188462 A1 | 6/2019 | Nishida |
| 2019/0205636 A1 | 7/2019 | Saraswat |
| 2019/0213822 A1 | 7/2019 | Jain |
| 2019/0250891 A1 | 8/2019 | Kumar |
| 2019/0266692 A1 | 8/2019 | Stach et al. |
| 2019/0317803 A1 | 10/2019 | Maheshwari |
| 2019/0324781 A1 | 10/2019 | Ramamurthy |
| 2019/0340240 A1 | 11/2019 | Duta |
| 2019/0377987 A1 | 12/2019 | Price et al. |
| 2020/0019767 A1 | 1/2020 | Porter et al. |
| 2020/0034976 A1 | 1/2020 | Stone et al. |
| 2020/0059441 A1* | 2/2020 | Viet ...................... G06Q 10/00 |
| 2020/0097742 A1 | 3/2020 | Kumar et al. |
| 2020/0104350 A1 | 4/2020 | Allen |
| 2020/0125635 A1 | 4/2020 | Nuolf |
| 2020/0147791 A1* | 5/2020 | Safary .................... G06N 20/00 |
| 2020/0151444 A1 | 5/2020 | Price et al. |
| 2020/0151591 A1 | 5/2020 | Li |
| 2020/0159647 A1 | 5/2020 | Puszkiewicz |
| 2020/0159648 A1 | 5/2020 | Ghare |
| 2020/0249964 A1 | 8/2020 | Fernandes |
| 2020/0273078 A1 | 8/2020 | Xu |
| 2020/0285353 A1 | 9/2020 | Rezazadeh Sereshkeh |
| 2020/0311210 A1 | 10/2020 | Nama |
| 2020/0334249 A1 | 10/2020 | Canim |
| 2021/0042516 A1 | 2/2021 | Panakkal |
| 2021/0049128 A1 | 2/2021 | Kernick |
| 2021/0107140 A1* | 4/2021 | Singh .................. G05B 19/4155 |
| 2021/0141497 A1 | 5/2021 | Magureanu |
| 2021/0216334 A1 | 7/2021 | Barrett |
| 2021/0279166 A1* | 9/2021 | Peng .................... G06F 9/3005 |
| 2022/0245936 A1 | 8/2022 | Valk |
| 2022/0405094 A1 | 12/2022 | Farquhar |
| 2023/0052190 A1 | 2/2023 | Goyal et al. |
| 2023/0053260 A1 | 2/2023 | Goyal et al. |

OTHER PUBLICATIONS

Notice of Allowance for 18/126,935, mailed Jan. 10, 2024.
Notice of Allowance for 17/463,494, mailed Jan. 16, 2024.
Notice of Allowance for U.S. Appl. No. 18/215,126, mailed Jan. 25, 2024.
Advisory Action and After Final Pilot Decision for U.S. Appl. No. 17/160,080, mailed Jan. 29, 2024.
Non-Final Office Action for U.S. Appl. No. 17/160,082, mailed Feb. 15, 2024.
Final Office Action for U.S. Appl. No. 17/206,029, mailed Feb. 28, 2024.
Non-Final Office Action for U.S. Appl. No. 17/160,080, mailed Mar. 13, 2024.
Non-Final Office Action for U.S. Appl. No. 17/160,084, mailed Mar. 15, 2024.
Non-Final Office Action for U.S. Appl. No. 18/094,305, mailed May 9, 2024.
Final Office Action for U.S. Appl. No. 17/160,084, mailed May 16, 2024.
Non-Final Office Action for U.S. Appl. No. 18/218,009, mailed May 20, 2024.
Al Salami, Load Balancing in Green Cloud Computation, Proceedings of the World Congress on Engineering 2013 vol. II, WCE 2013, 2013, pp. 1-5 (Year: 2013).
B.P. Kasper "Remote: A Means of Remotely Controlling and Storing Data from a HAL Quadrupole Gas Analyzer Using an IBM-PC Compatible Computer", Nov. 15, 1995, Space and Environment Technology Center.
Bergen et al., RPC automation: making legacy code releant, May 2013, 6 pages.
Hu et al., Automating GUI testing for Android applications, May 2011, 7 pages.
Konstantinou et al., An architecture for virtual solution composition and deployment in infrastructure clouds, 9 pages (Year: 2009)
Nyulas et al., An Ontology-Driven Framework for Deploying JADE Agent Systems, 5 pages (Year: 2006).
Tom Yeh, Tsung-Hsiang Chang, and Robert C. Miller, Sikuli: Using GUI Screenshots for Search and Automation, Oct. 4-7, 2009, 10 pages.
Yu et al., Deplying and managing Web services: issues, solutions, and directions, 36 pages (Year: 2008).
Zhifang et al., Test automation on moble device, May 2010, 7 pages.
Non-Final Office Action for U.S. Appl. No. 17/230,492, mailed Oct. 14, 2022.
Notice of Allowance for U.S. Appl. No. 16/398,532, mailed Oct. 23, 2022.
Non-Final Office Action for U.S. Appl. No. 16/876,530, mailed Sep. 29, 2020.
Final Office Action for U.S. Appl. No. 16/876,530, mailed Apr. 13, 2021.

(56) References Cited

OTHER PUBLICATIONS

Notice of Allowance for U.S. Appl. No. 16/876,530, mailed Jul. 22, 2021.
Dai, Jifeng et al., "R-fcn: Object detectiom via region-based fully convolutional networks", Advances in neural information processing systems 29 (2016). (Year: 2016).
Ren, Shaoqing et al., "Faster r-cnn: Towards real0time object detection with region proposal network." Advances in neutral information processing systems 28 (2015). (Year: 2015).
Zhifang et al., Test automation on mobile device, May 2010, 7 pages.
International Search Report for PCT/US2021/053669, dated May 11, 2022.
Embley et al., "Table-processing paradigms: a research survey", International Journal on Document Analysis and Recognition, vol. 8, No. 2-3, May 9, 2006, pp. 66-86.
Non-Final Office Action for U.S. Appl. No. 16/925,956, mailed Sep. 16, 2021.
Notice of Allowance for U.S. Appl. No. 16/925,956, mailed Jan. 7, 2022.
Pre-Interview Office Action for U.S. Appl. No. 16/398,532, mailed Jul. 8, 2022.
Notice of Allowance for U.S. Appl. No. 16/398,532, mailed Oct. 13, 2022.
Non-Final Office Action for U.S. Appl. No. 17/139,838, mailed Feb. 22, 2022.
Final Office Action for U.S. Appl. No. 17/139,838, mailed Nov. 15, 2022.
Notice of Allowance for U.S. Appl. No. 17/139,838, mailed Apr. 5, 2023.
International Search Report and Written Opinion for PCT/US2021/015691, mailed May 11, 2021.
A density-based algorithm for discovering clusters in large spatial databases with noise, Ester, Martin; Kriegel, Hans-Peter; Sander, Jorg; Xu, Xiaowei, Simoudis, Evangelos; Han, Jiawei; Fayyad, Usama M., eds., Proceedings of the Second International Conference on Knowledge Discovery and Data Mining (KDD-96). AMI Press. pp. 226-231 (1996).
Deep Residual Learning for Image Recognition, by K. He, X. Zhang, S. Ren, and J. Sun, arXiv: 1512.03385 (2015).
FaceNet: A Unified Embedding for Face Recognition and Clustering, by F. Schroff, D. Kalenichenko, J. Philbin, arXiv:1503.03832 (2015).
Muhammad et al. "Fuzzy multilevel graph embedding", copyright 2012 Elsevier Ltd.
Sharma et al. Determining similarity in histological images using graph-theoretic description and matching methods for content-based image retrieval in medical diagnostics, Biomed Center, copyright 2012.
First Action Interview Pilot Program Pre-Interview communication for U.S. Appl. No. 16/779,462, mailed Dec. 3, 2021.
Reply under 37 CDT 1.111 to Pre-Interview Communication for U.S. Appl. No. 16/779,462, filed Jan. 25, 2022.
Notice of Allowance for U.S. Appl. No. 16/779,462 mailed Feb. 9, 2022.
Notice of Allowance for U.S. Appl. No. 17/131,674, mailed Jun. 22, 2023.
Non-Final Office Action for U.S. Appl. No. 16/731,044, mailed Jan. 25, 2021.
Notice of Allowance for U.S. Appl. No. 16/731,044, mailed May 5, 2021.
Non-Final Office Action for U.S. Appl. No. 18/126,935, mailed Jul. 13, 2023.
Non-Final Office Action for U.S. Appl. No. 17/139,842, mailed Jul. 18, 2023.
Notice of Allowance for U.S. Appl. No. 17/588,588, mailed Aug. 2, 2023.
Pre-Interview Office Action for U.S. Appl. No. 16/859,488, mailed Jan. 25, 2021.
First Action Interview for U.S. Appl. No. 16/859,488, mailed Mar. 22, 2021.
Final Office Action for U.S. Appl. No. 16/859,488, mailed Jul. 8, 2021.
Notice of Allowance for U.S. Appl. No. 16/859,488, mailed Mar. 30, 2022.
Final Office Action for U.S. Appl. No. 17/463,494, mailed Sep. 6, 2023.
Final Office Action for U.S. Appl. No. 17/160,080, mailed Sep. 11, 2023.
Final Office Action for U.S. Appl. No. 17/534,443, mailed Sep. 11, 2023.
Final Office Action for U.S. Appl. No. 16/930,247 mailed Oct. 12, 2023.
Notice of Allowance for U.S. Appl. No. 17/534,443 mailed Oct. 24, 2023.
International Search Report and Written Opinion for PCT/US2022/013026, mailed Sep. 21, 2022.

* cited by examiner

ROBOTIC PROCESS AUTOMATION WITH RESILIENT PLAYBACK OF RECORDINGS

CROSS-REFERENCE TO RELATED APPLICATIONS

This application claims priority to U.S. Patent Provisional Application No. 63/139,757, filed Jan. 20, 2021, and entitled "ROBOTIC PROCESS AUTOMATION WITH RESILENT PLAYBACK CAPABILITIES," which is hereby incorporated herein by reference.

This application claims priority to U.S. Patent Provisional Application No. 63/060,541, filed Aug. 3, 2020, and entitled "ROBOTIC PROCESS AUTOMATION WITH RESILENT PLAYBACK CAPABILITIES," which is hereby incorporated herein by reference.

BACKGROUND OF THE INVENTION

Robotic process automation (RPA) systems enable automation of repetitive and manually intensive computer-based tasks. In an RPA system, computer software, namely a software robot (often referred to as a "bot"), may mimic the actions of a human being in order to perform various computer-based tasks. For instance, an RPA system can be used to interact with one or more software applications through user interfaces, as a human being would do, Therefore, RPA systems typically do not need to be integrated with existing software applications at a programming level, thereby eliminating the difficulties inherent to integration. Advantageously, RPA systems permit the automation of application level repetitive tasks via software robots that are coded to repeatedly and accurately perform the repetitive tasks.

Unfortunately, however, interacting with one or more software applications through user interfaces, as a human would do, can be problematic when playback engines evolve over time and may not continue to completely support legacy software robots, or when user interfaces appear differently due to variations in screen (or window) size or resolution. Therefore, there is a need for improved approaches to understand and interact with user interfaces of software applications, such that RPA systems are able to operate even legacy software robots with increased reliability and flexibility.

SUMMARY

Improved playback capabilities for RPA systems are disclosed. Certain embodiments can provide resilient playback of software automation processes by providing enhanced capabilities to locate user interface controls within a screen image of a user interface of an application program being utilized by the software automation processes. Using such capabilities, embodiments can provide resilient playback of software automation processes by providing the capability to resolve playback errors by detecting user interface controls within at least one screen image of a user interface that was captured when the software automation process was created. Advantageously, embodiments disclosed herein allow software automation processes to continue to operate over time and thus with greater resiliency and flexibility.

The invention can be implemented in numerous ways, including as a method, system, device, apparatus (including computer readable medium and graphical user interface). Several embodiments of the invention are discussed below.

As a computer-implemented method for playing back a previously established recording having a plurality of recorded actions undertaken with respect to one or more software programs, one embodiment can, for example, include at least: initiating playback of the previously established recording, the previously established recording including at least properties and previously captured screen images for one or more of the recorded actions within the recording; determining if an error occurred during playback of a particular action of the previously established recording; and resolving the error that occurred during playback of the particular action of the previously established recording. Additionally, resolving the error that occurred during playback of the particular action of the previously established recording can, in one embodiment, include at least: identifying a particular captured screen image of the previously captured screen images that corresponds to the particular action; detecting a position in the particular captured screen image that is associated with the particular action; detecting one or more control objects in the particular captured screen image that are proximate to the position detected in the particular captured screen image; identifying a corresponding control object within the one or more control objects detected in the particular captured screen image that corresponds to the particular action; and facilitating playback of the particular action using the corresponding control object.

As a computer-implemented method for playing back a previously established recording having a plurality of recorded actions undertaken with respect to one or more software programs, one embodiment can, for example, include at least: initiating execution of the previously established recording, the previously established recording including at least properties and previously captured screen images for one or more of the recorded actions within the recording; determining if an error occurred during execution of the previously established recording; identifying, in response to the determining the error occurred, a particular action of the one or more of the recorded actions within the previously established recording in which the error occurred; identifying a particular captured screen image of the previously captured screen images that corresponds to the particular action; detecting control objects in the particular captured screen image; locating a particular control object within the control objects detected in the particular captured screen image based on at least properties of the particular action from the previously established recording; and facilitating execution of the particular action using the particular control object.

As a non-transitory computer readable medium including at least computer program code tangibly stored therein for playing back a previously established recording having a plurality of recorded actions of a robotic process automation system, one embodiment can, for example, include at least: computer program code for initiating execution of the previously established recording; computer program code for determining if an error occurred during execution of the previously established recording; computer program code for identifying, in response to the determining the error occurred, a particular action of the plurality of recorded actions of the previously established recording in which the error occurred; computer program code for identifying a particular captured screen image of the previously captured screen images that corresponds to the particular action; computer program code for detecting one or more control objects in the particular captured screen image; computer program code for identifying a particular control object within the one or more control objects detected in the particular captured screen image based on at least one or more properties of the particular action from the previously established recording; and computer program code for facilitating execution of the particular action using the particular control object.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like elements, and in which.

DETAILED DESCRIPTION OF CERTAIN EMBODIMENTS

Figure 1:
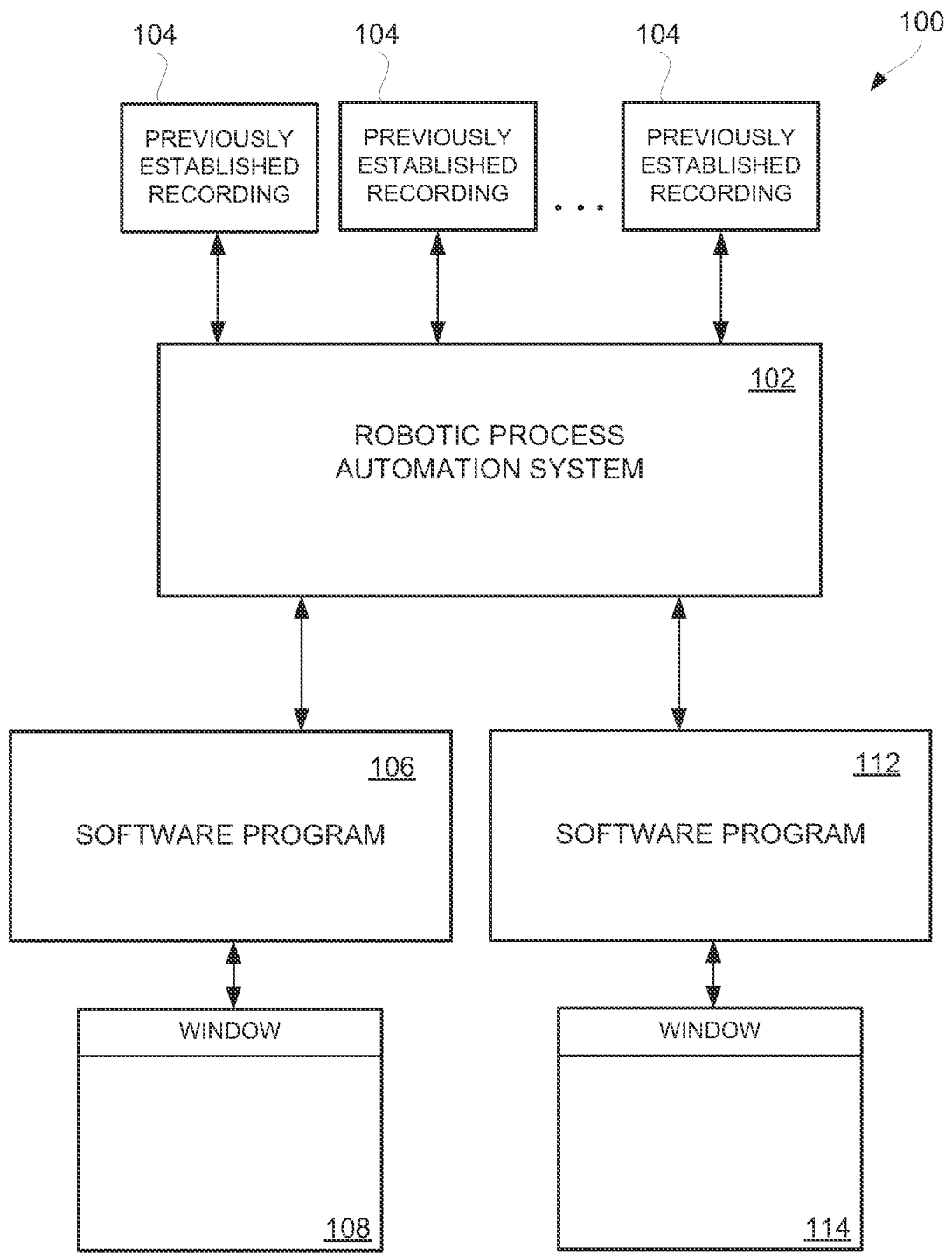
FIG. 1 is a block diagram of a programmatic automation environment according to one embodiment.

RPA systems with improved playback capabilities are disclosed. Certain embodiments can provide resilient playback of software automation processes by providing enhanced capabilities to locate user interface controls within a screen image of a user interface of an application program being utilized by the software automation processes. Using such capabilities, embodiments can provide resilient playback of software automation processes by providing the capability to resolve playback errors by detecting user interface controls within at least one screen image of a user interface that was captured when the software automation process was created. Advantageously, embodiments disclosed herein allow software automation processes to continue to operate over time with greater resiliency and flexibility.

Generally speaking, RPA systems use computer software to emulate and integrate the actions of a human interacting within digital systems. In an enterprise environment, the RPA systems are often designed to execute a business process. In some cases, the RPA systems use artificial intelligence (AI) and/or other machine learning capabilities to handle high-volume, repeatable tasks that previously required humans to perform. The RPA systems also provide for creation, configuration, management, execution, and/or monitoring of software automation processes.

A software automation process can also be referred to as a software robot, software agent, or a bot. A software automation process can interpret and execute tasks on one's behalf. Software automation processes are particularly well suited for handling a lot of the repetitive tasks that humans perform every day. Software automation processes can accurately perform a task or workflow they are tasked with over and over. As one example, a software automation process can locate and read data in a document, email, file, or window. As another example, a software automation process can connect with one or more Enterprise Resource Planning (ERP), Customer Relations Management (CRM), core banking, and other business systems to distribute data where it needs to be in whatever format is necessary. As another example, a software automation process can perform data tasks, such as reformatting, extracting, balancing, error checking, moving, copying, or any other desired tasks. As another example, a software automation process can grab data desired from a webpage, application, screen, file, or other data source. As still another example, a software automation process can be triggered based on time or an event, and can serve to take files or data sets and move them to another location, whether it is to a customer, vendor, application, department or storage. These various capabilities can also be used in any combination. As an example of an integrated software automation process making use of various capabilities, the software automation process could start a task or workflow based on a trigger, such as a file being uploaded to an FTP system. The integrated software automation process could then download that file, scrape relevant data from it, upload the relevant data to a database, and then send an email to a recipient to inform the recipient that the data has been successfully processed.

Embodiments of various aspects of the invention are discussed below with reference to FIGS. 1-12. However, those skilled in the art will readily appreciate that the detailed description given herein with respect to these figures is for explanatory purposes as the invention extends beyond these limited embodiments.

FIG. 1 is a block diagram of a programmatic automation environment 100 according to one embodiment. The programmatic automation environment 100 is a computing environment that supports RPA. The computing environment can include or make use of one or more computing devices. Each of the computing devices can, for example, be an electronic device having computing capabilities, such as a mobile phone (e.g., smart phone), tablet computer, desktop computer, portable computer, server computer, and the like.

The programmatic automation environment 100 serves to support recordation of a series of user interactions of a user with one or more software programs operating on a computing device, and then subsequently provide programmatic playback of the series of user interactions with the same one or more software programs operating on the same or different computing device. The recordation of the series of user interactions forms a recoding. The recording defines or describes a software automation process. Programmatic playback of a recording refers to the notion that the playback is undertaken by a computer program, as opposed to a user.

Playback of a recording refers to execution of the recording, which carries out the software automation process.

The programmatic automation environment 100 includes a RPA system 102 that provides the robotic process automation. The RPA system 102 supports a plurality of different robotic processes, which can be denoted as software automation processes. These software automation processes can also be referred to as "software robots," "bots" or "software bots." More particularly, in one embodiment, the software automation processes are defined or described by respective recordings, namely, previously established recordings 104 as shown in FIG. 1. The RPA system 102 can create, maintain, execute, and/or monitor recordings, including previously established recordings 104, to carry out software automation processes. The RPA system 102 can also report status or results of software automation processes.

The RPA system 102 supports creation and storage of software automation processes. These software automation processes can be referred to as "bots". In the simplified block diagram shown in FIG. 1, the RPA system 102 can support a recording session in which a series of user interactions with one or more application programs operating on a computing device can be recorded. In general, recording of a software automation process refers to creation of the software automation process. The series of user interactions can then be utilized by the RPA system 102 to form a software automation process (e.g., bot) for carrying out such actions in an automated manner. The RPA utilization environment 100 can also store the software automation processes (e.g., bots) that have been created.

In addition, the RPA system 102 further supports the execution of the one or more software automation processes that have been created by the RPA system 102 or some other RPA system. Execution (or running) of a software automation process at a computing device causes playback of the software automation process. That is, when a software automation process is executed or run by one or more computing devices, the software automation process is being "played back" or undergoing "playback." Advantageously, the RPA system 102 supports the playback of software automation processes in a resilient fashion.

On execution of one or more of the previously established recordings 104, the previously established recordings 104, via the RPA system 102, can interact with one or more software programs 106. One example of the software program 106 is an application program. The application programs can vary widely with user's computer system and tasks to be performed thereon. For example, application programs being used might be word processing programs, spreadsheet programs, email programs, ERP programs, CRM programs, web browser programs, any many more. The software program 106, when operating, typically interacts with one or more windows 108. For example, a user interface presented within the one or more windows 108 can be programmatically interacted with through execution of the one or more software automation processes 104.

In some cases, the software program 106 is seeking to access documents that contain data that is to be extracted and then suitably processed. The documents are typically digital images of documents, which are presented in the one or more windows 108. The RPA system 102 can include processing and structures to support the extraction of data from such document images. Some examples of documents 108 include emails, web pages, forms, invoices, purchase orders, delivery receipts, bill of lading, insurance claims forms, loan application forms, tax forms, payroll reports, etc.

When robotic process automation operations are being performed, the RPA system 102 seeks to interact with the software program 106. However, since the RPA system 102 is not integrated with the software program 106, the RPA system 102 requires an ability to understand what content is contained in the window 108. For example, the content being presented in the window 108 can pertain to a graphical user interface or a document. In this regard, the RPA system 102 interacts with the software program 106 by interacting with the content in the window 108. By doing so, the software automation process being carried out, via the RPA system 102, can effectively interface with the software program 106 via the window 108 as would a user, even though no user is involved because the actions detailed in the previously established recording 104 for the software automation process are programmatically performed. Once the content of the window 108 is captured and understood, the RPA system 102 can perform an action requested by the previously established recording 104 by inducing action with respect to the software program 106.

Likewise, when robotic process automation operations are being performed, the RPA system 102 can also seek to interact with the software program 112, which can be another application program. However, since the RPA system 102 is not integrated with the software program 112, the RPA system 102 requires an ability to understand what content is being presented in window 114. For example, the content being presented in the window 114 can pertain to user interface or a document. In this regard, the RPA system 102 interacts with the software program 112 by interacting with the content in the window 114 corresponding to the software program 112. By doing so, the software automation process being carried out, via the RPA system 102, can effectively interface with the software program 112 via the window 114 as would a user, even though no user is involved because the actions detailed in the previously established recording 104 for the software automation process are programmatically performed. Once the content of the window 114 is captured and understood, the RPA system 102 can perform an action requested by the previously established recording 104 by inducing action with respect to the software program 112.

The RPA system 102 further supports the execution of the software automation process in a resilient manner. The resiliency allows the execution of software automation processes to successfully complete even when there are changes to recording playback engines or software programs since the recording for the software automation process was originally made, or when there are variations in graphical user interface associated with and presented during the playback. During execution (i.e., playback) of a software automation process, the playback can use a playback recording engine. The recording playback engine is initially the same engine or a related engine by which the software automation process was recorded. As such, initially, the recording playback engine is fully compatible with the recording. However, over time, the recording playback engine being used to execute (i.e., playback) a recording can be updated or changed. In such a case, the recording playback engine may not be fully compatible with the prior recording, and thus may result in errors during execution. The RPA system 102 operates to execute (i.e., playback) the software automation process in a resilient manner such that errors, that results from changes to recording playback engines, can often be overcome so that such errors do not result in a failure to carry out the software automation process.

Also, during execution (i.e., playback) of a software automation process, the graphical user interface associated with and presented during the playback can take different sizes, positions, orientations, organizations, formats, and the like. As such, the RPA system 102 can also operate to execute (i.e., playback) the software automation process in an intelligent manner such that differences in how the graphical user interfaces of the one or more application programs involved in the software automation process are presented can be managed so that such differences do not result in a failure to carry out the software automation process.

Figure 2:
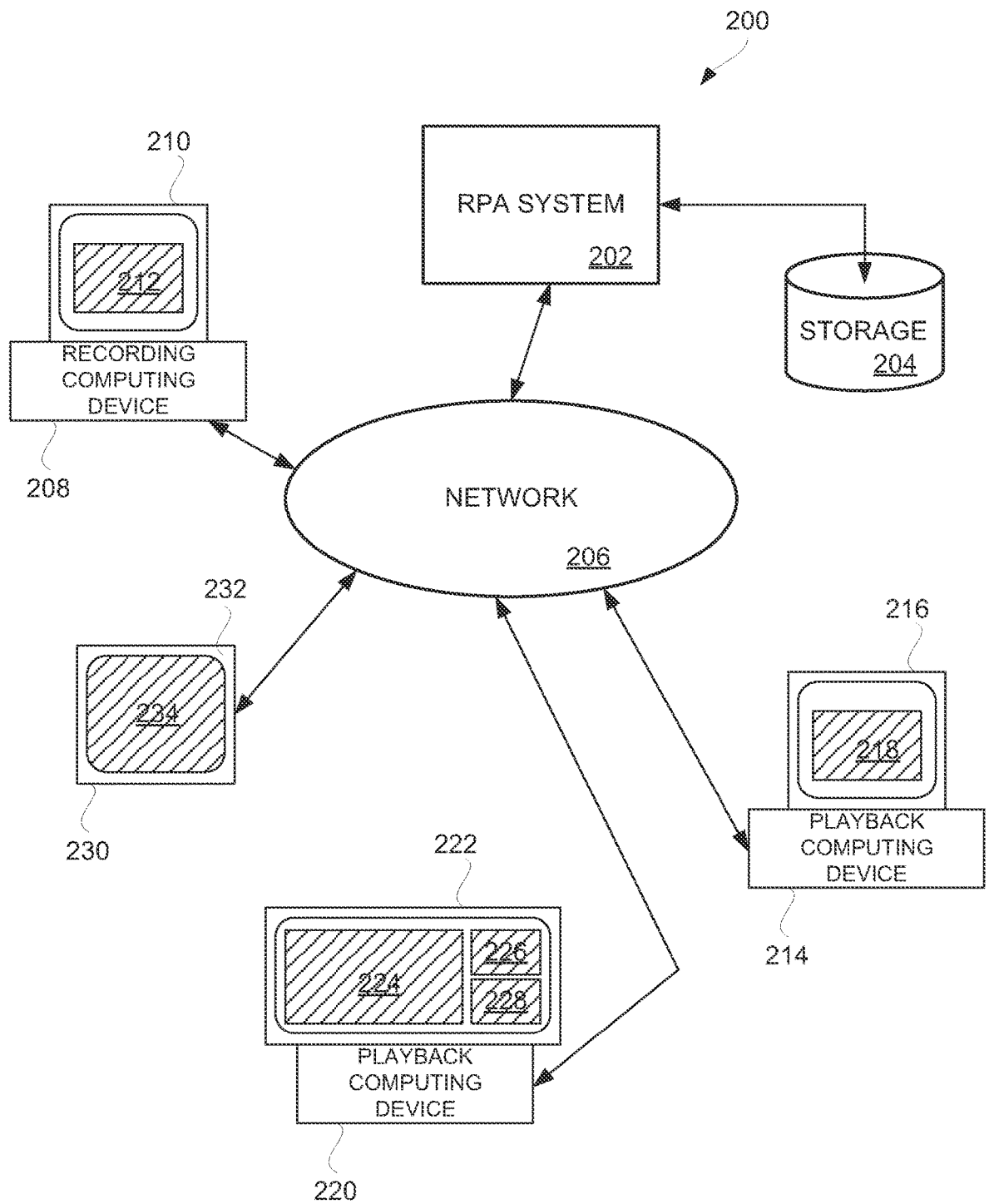
FIG. 2 is a block diagram of a computing environment according to one embodiment.

FIG. 2 is a block diagram of a computing environment 200 according to one embodiment. The computing environment 200 includes a RPA system 202. The RPA system 202 is, for example, similar to the RPA system 102 illustrated in FIG. 1. The RPA system 202 can be coupled to a storage 204 for storage of software automation processes (e.g., bots).

Additionally, the computing environment 200 can support various different types of computing devices that can interact with the RPA system 202. The computing environment 200 can also include a network 206 made up of one or more wired or wireless networks that serve to electronically interconnect various computing devices for data transfer. These computing devices can serve as a recording computing device, a playback computing device, or both. As shown in FIG. 2, the computing environment 200 can include a recording computing device 208 that includes a display device 210 and a window 212 presented on the display device 210. The window 212 can, in one example, depict a user interface that is associated with recording user interactions with one or more application programs to produce a software automation process using the RPA system 202.

The computing environment 200 shown in FIG. 2 can also include various playback computing devices. A first playback computing device 214 includes a display device 216 that can present a window 218. A second playback computing device 220 includes a display device 222 that can present a first window 224, a second window 226 and a third window 228. A third playback computing device 230 includes a display device 232 that can present a window 234. More generally, the windows are screens that are presented and visible on respective display devices. Of course, the recording computing device 208 can also operate as a playback computing device.

The different playback computing devices 214, 220 and 230 can all have different window sizes. While the window 218 utilized by the playback computing device 214 is similar to the window 212 utilized by the recording computing device 208, the windows, such as window 224 and 234, of the other playback computing devices 220, 230, respectively, can be different. As a result, the execution of a software automation process by way of the RPA System 202 may not execute properly on any of the playback computing devices. For example, the window 224 utilized by the playback computing device 220 is definitely larger than the window 212 utilized by the recording computing device 208. As a result, the layout of the user interface presented within the window 224 on playback will not have the same visual appearance as did the user interface as it is presented in the window 212 during recording. Similarly, the window 234 utilized by the playback computing device 230 is of a different size and orientation as compared to the window 212 utilized by the recording computing device 208 during recording. While the window 218 utilized by the playback computing device 214 does generally appear similar to the window 212 utilized by the recording computing device 208 at least as to size and shape, the resolution at which the associated user interfaces are presented within those windows may still vary, which can similarly alter the content or appearance of the user interfaces that are presented (e.g., displayed) within those windows.

Besides execution errors that can result from changes to size, layout and resolution, a recording playback program being utilized during execution (e.g., playback) of a software automation process might have changed or been updated over time. Hence, software automation processes that were created (e.g., recorded) months or years ago can be created using a legacy recording/playback program. However, during playback at a later time, it might use a newer or different recording/playback program. In such cases, during playback, changes to recording/playback programs can cause errors when software automation processes are executed. Also, a software automation process might have been created to interact with a former version of a software program, and then subsequently, when executed, seek to interact with a newer version of the same software program. In some cases, the changes to the software program can cause execution (i.e., playback) of a software automation process to fail to properly execute. Advantageously, in some instances, such errors can be automatically corrected through embodiments disclosed herein, where the errors can be overcome by processing images associated with a software automation process when it was formed.

Figure 3A:
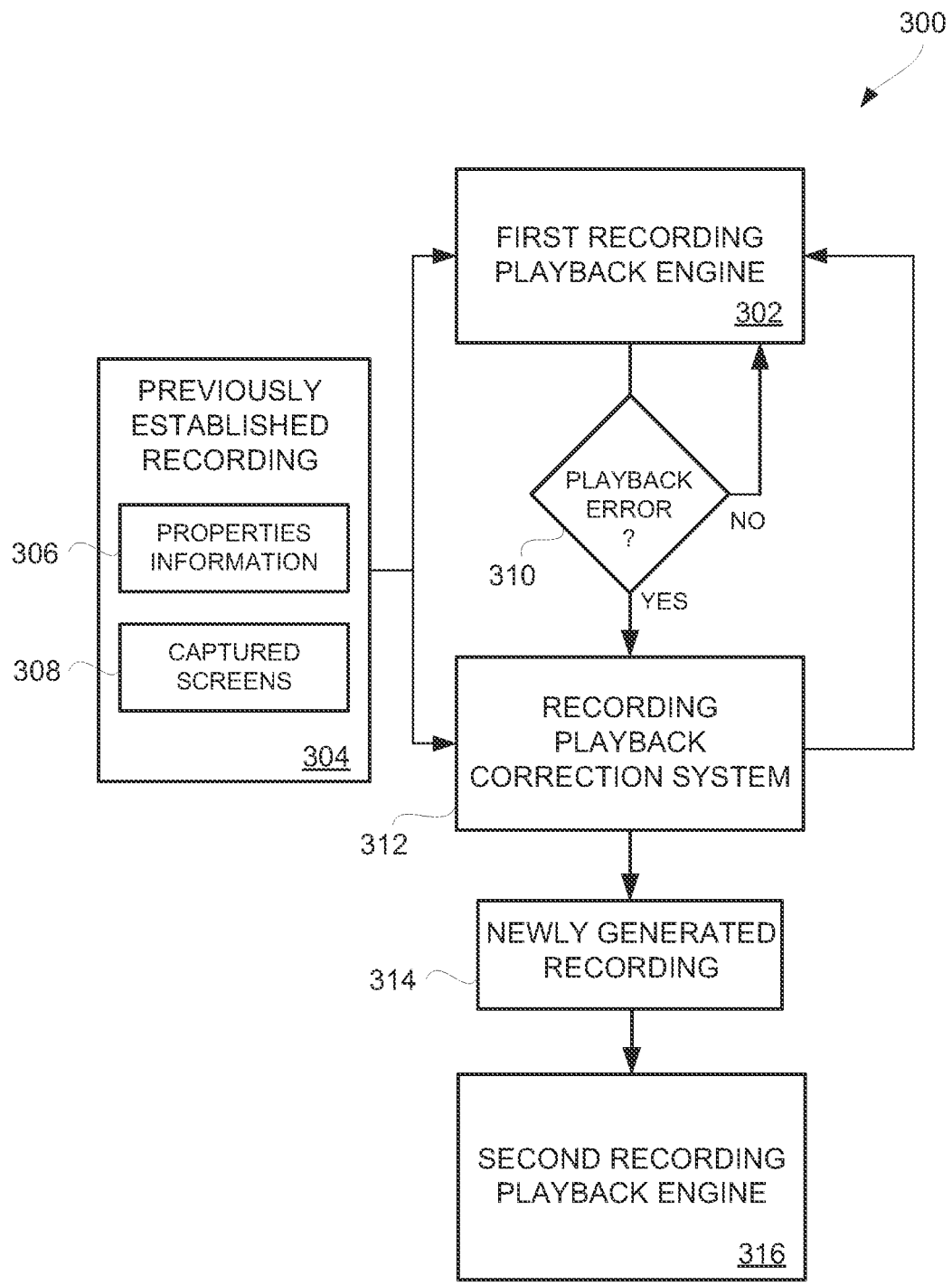
FIG. 3A is a resilient playback system according to one embodiment.

FIG. 3A is a resilient playback system 300 according to one embodiment. The resilient playback system 300 operates to playback one or more previously established recordings. While playing back the one or more previously established recordings, a playback error may occur. In such case, the resilient playback system 300 is often able to correct the error such that the playback of the recording can continue. The nature of the correction can include correction or augmentation of the previously established recording, or can involve the creation of a new recording. In either case, if the error is able to be corrected, playback can continue.

The resilient playback system 300 includes a first recording playback engine 302. The first recording playback engine operates to play back a recording. The first recording playback engine can also operate to create a recording. Hence, the first recording playback engine can operate to create a recording and/or play back a previously established recording. As an example, the first recording playback engine 302 can rely on various methods, such as object cloning, when creating a recording. In object cloning, all object properties and associated data can be captured and recreated via parsing information directly available from an application. These types of recordings rely on the existence of certain properties for each of the control objects in user interfaces of the corresponding software programs being used. When these properties change, the conventional playback of these recordings often fail because the necessary control objects cannot be found. Advantageously, however, the resilient playback system 300 is often able to invoke additional processing to resolve such errors such that previously established recordings are able to remain effective.

The first recording playback engine 302 receives a previously established recording 304. The previously established recording 304 is designed to facilitate robotic process automation. The previously established recording 304 details actions to be carried out by the previously established recording 304 with respect to one or more software programs. The previously established recording 304 typically includes properties information 306 concerning the various objects being utilized thereby. For example, the properties information can be properties such as: name, control type, action, path, input value, control state, object capture technology type, and other available properties. The previously established recording 304 also typically includes captured screens 308. The captured screens 308 are captured during creation of the previously established recording 304. The captured screens 308 can be screen images associated with user interfaces of software programs that are being interacted with during creation of the previously established recording 304.

The previously established recording 304 is provided to the first recording playback engine 302 so that the previously established recording 304 can be played back. While the first recording playback engine 302 is playing back (or executing) the previously established recording 304, a decision 310 can determine whether a playback error has occurred during the playback. If decision 310 determines that a playback error has occurred, a recording playback correction system 312 can be invoked. The recording playback correction system 312 receives the error information from the first recording playback engine 302 and can also receive the previously established recording 304. The recording playback correction system 312 can use one or more of the captured screens 308 from the previously established recording 304 to determine a correction to resolve the playback error. Once the correction has been determined, a correction update can be provided to the first recording playback engine 302 such that the first recording playback engine 302 can continue with the playback.

Alternatively, or additionally, after the recording playback correction system 312 has identified the correction, a newly generated recording 314 can be formed. In such a case, if a newly generated recording 314 is formed, then subsequently the newly established recording 314 can be used in place of the previously established recording 304. In one embodiment, the newly generated recoding 314 may be played back by the first recording playback engine 302. In another embodiment, resilient playback system 300 can further include a second recording playback engine 316 that is designed to play (or execute) the newly generated recording 314. This, for example, can permit previously established recordings to be upgraded to new recordings that are more compatible and compliant with newer and often more efficient recording playback engines, such as the second recording playback engine 316.

Figure 3B:
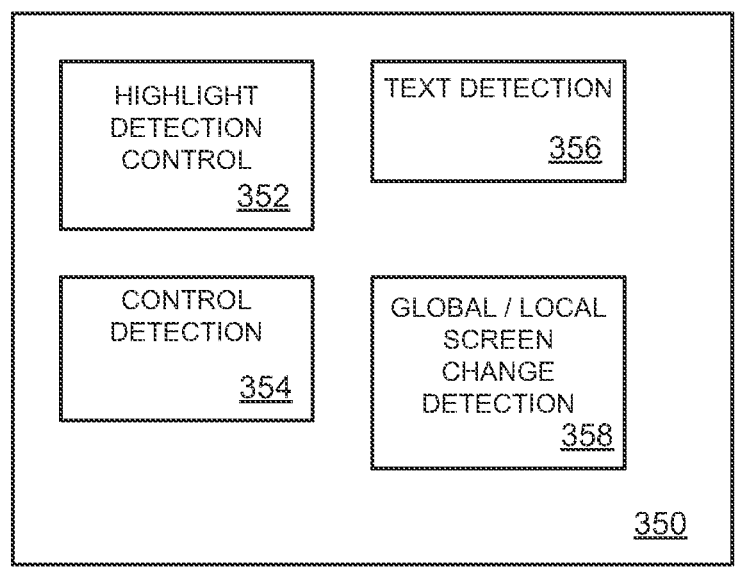
FIG. 3B is a block diagram of a recording playback correction system according to one embodiment.

FIG. 3B is a block diagram of a recording playback correction system 350 according to one embodiment. The recording playback correction system 350 is, for example, one embodiment of the recording playback correction system 312 illustrated in FIG. 3A.

The recording playback correction system 350 includes various components, including a highlight detection control 352, a control detection 354, a text detection 356, and a global/local screen change detection 358. These components within the recording playback correction system 350 represent different processing modules to perform specific functions that can be utilized to determine a playback correction when a playback error has occurred.

The highlight detection control 352 can identify a highlighted object within a screen image that was captured by a recorder while producing a previously established recording. The screen image can be a captured screen (e.g., captured screen 308) of the previously established recording. With some recordings, the screen image being captured at the time of recording can include highlighting around an object in which an action with respect to a user interface was recorded. The highlighting can serve as an indicator for a particular object within the screen image that corresponds to a particular action to be performed. In the case where a recording failed in attempting to perform an action, the highlighting (if present) in the screen image associated with the action can provide an indication of an object within the screen image that corresponds to the action. Highlight detection can be performed by training a deep neural network (e.g., RetinaNet, EfficientDet) on a dataset of images with highlight control examples in it. The training and inference regime can follow control object detection via invariance guided sub-control learning. In general, deep neural networks can be trained using back propagation and optimizing relevant loss functions. Alternatively, highlight detection may be performed using classical machine learning techniques, such as Support Vector Machines or analyzing edges and their colors using classical computer vision techniques.

The control detection 354 can identify objects within a screen image captured (e.g., captured screen 308) by a recorder while producing a previously established recording. Then, using the identified objects along with assistance of positional information and/or properties information (e.g., properties information 306) available from (or associated with) the previously established recording, a particular object within the screen image that corresponds to a particular action to be performed by the recording that has failed can be detected and located within the screen image. Control detection can be performed by training a deep neural network (e.g., RetinaNet, EfficientDet) on a dataset of images with object examples in it. The training and inference regime can follow control object detection via invariance guided sub-control learning. In general, deep neural networks can be trained using back propagation and optimizing relevant loss functions.

Additional details on highlight detection and control detection from images according to some embodiments are provided in (i) U.S. patent application Ser. No. 16/527,048, filed Jul. 31, 2019, and entitled "AUTOMATED DETECTION OF CONTROLS IN COMPUTER APPLICATIONS WITH REGION BASED DETECTORS," which is hereby incorporated by reference herein by reference; and (ii) U.S. patent application Ser. No. 16/876,530, filed May 18, 2020, and entitled "DETECTION OF USER INTERFACE CONTROLS VIA INVARIANCE GUIDED SUB-CONTROL LEARNING," which is hereby incorporated herein by reference for all purposes.

The global/local screen change detection 358 can be utilized to determine whether a particular action of interest with respect to the previously established recording induced a global screen change or a local screen change. Global screen changes signal that a dramatic change to the screen image occurred as a result of the particular action. Examples of global changes to the screen image are, for example, display of a new page, a pop-up window, a next page, and the like. Local screen changes are minor changes to the screen image as a result of the particular action. Examples of local screen changes include text entry, check box change, radio box change, button selection, and the like. As further discussed below (e.g., in FIGS. 6B and 7B), the processing by the recording playback correction system 350 can differ depending upon whether the particular action caused a global screen change or a local screen change.

The text detection 356 can be used to optionally determine text within the captured screen image, such as by the control detection 354. The text can be used to assist in locating object controls within the screen image. In this regard, when forming a new recording, for example, the text detection information along with the detected controls can be interrelated such that the new recording is itself resilient when it is being executed by a new recording playback engine, such as the second recording playback engine 316 illustrated in FIG. 3A. Additional details on text detection and use thereof for detecting controls are provided in U.S. Patent Provisional Application No. 63/060,541, filed Aug. 3, 2020, and entitled "ROBOTIC PROCESS AUTOMATION WITH RESILENT PLAYBACK CAPABILITIES," which is hereby incorporated herein by reference for all purposes.

Figure 4:
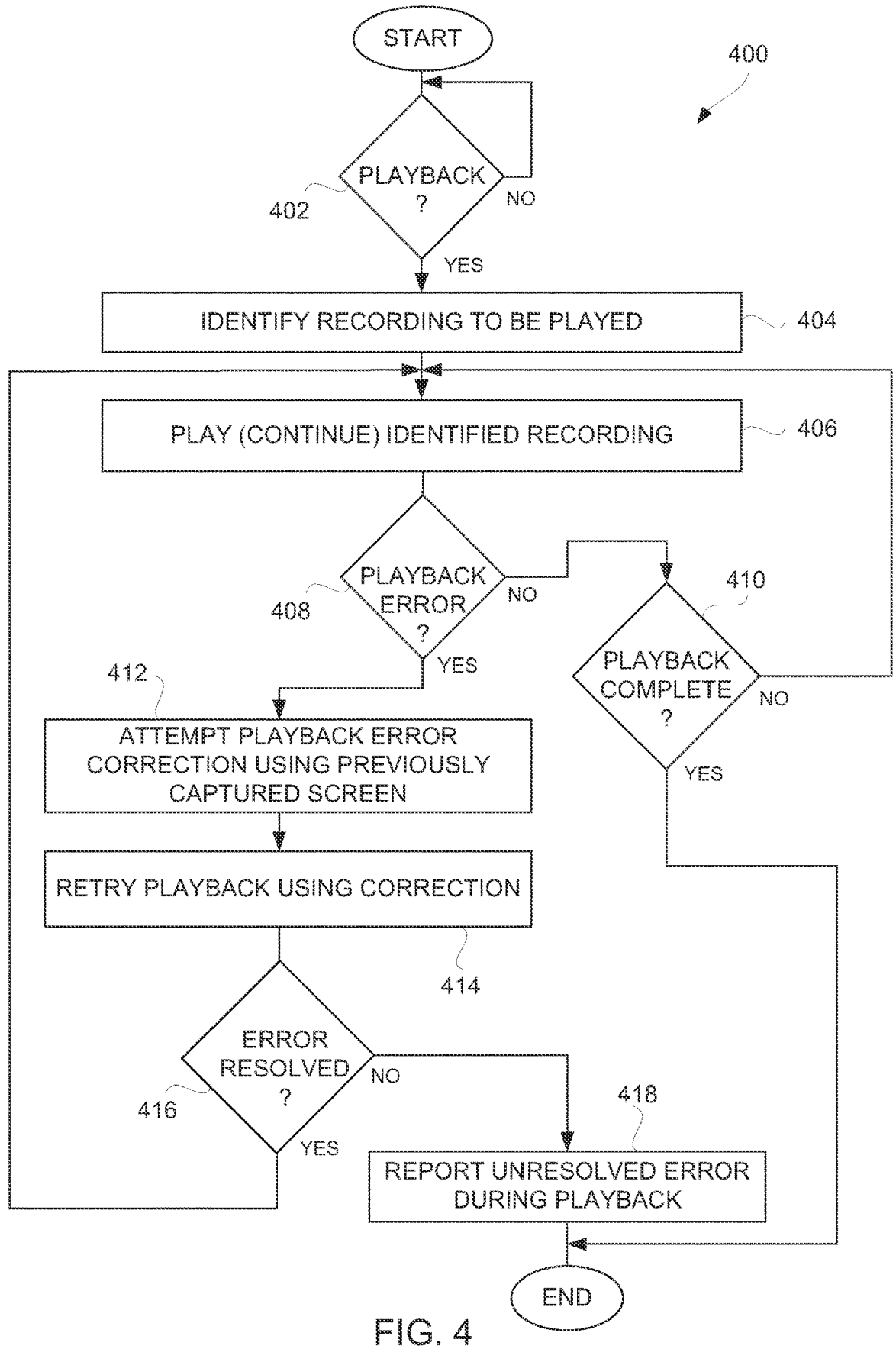
FIG. 4 is a flow diagram of a resilient playback process according to one embodiment.

FIG. 4 is a flow diagram of a resilient playback process 400 according to one embodiment. The resilient playback process 400 is, for example, processing performed by the resilient playback system 300 illustrated in FIG. 3A or the robotic process automation system 102 illustrated in FIG. 1.

The resilient playback process 400 can initially determine 402 whether a previously established recording is to be played back (i.e., executed). The playback of the previously established recording serves to invoke robotic process automation. When the decision 402 determines that playback of a previously established recording is not currently being requested, the resilient playback process 400 can await until playback has been requested. Once the decision 402 determines that playback of a previously established recording has been requested, a recording to be played can be identified 404. Typically, the recording to be played is a previously established recording.

Next, the identified recording can be played 406. During the playing of the identified recording, various actions occur with respect to various objects associated with interaction with one or more software programs. The recording playback engine (e.g., first recording playback engine 202) that is to play the identified recording may have been updated or changed since the previously established recording was made. As such, the updated recording playback engine may not be fully compatible with identified recording, which can also cause errors during the playback of the identified recording. Also, since the one or more software programs may have been updated since the previously established recording was made, resulting changes that have occurred in the one or more software applications can cause errors during the playback of the identified recording.

The resilient playback process 400 also includes a decision 408 that determines whether a playback error has occurred. When the decision 408 determines that no playback error has occurred, a decision 410 can determine whether playback has been completed. When the decision 410 determines that playback has completed, the resilient playback process 400 can end. Alternatively, when the decision 410 determines that playback has not completed, then the resilient playback process 400 can return to repeat the block 406 and subsequent blocks so that the playback of the identified recording can continue.

On the other hand, when the decision 408 determines that a playback error has occurred during the playing back of the identified recording, the resilient playback process 400 can attempt 412 playback error correction using at least one or more previously captured screens. These one or more previously captured screens are associated with the previously established recording that is being played as the identified recording. For example, in one embodiment, the identified recording can be the previously established recording 304 having properties information 306 and captured screens 308 (i.e., FIG. 3A). Through use of the one or more previously captured screens, additional image-based processing can be performed to attempt 412 playback error correction. This error correction processing evaluates the one or more previously captured screens and detects objects therein, and then identifies an object and action that corresponds to an action with respect to the previously established recording. Following the playback error correction attempt 412, playback can be retried 414 using the playback error correction. In one implementation, the retry can involve retrying playback of the identified recording after augmenting the identified recording based on the playback error correction. In another implementation, the retry can involve creation of a new recording including the playback error correction, and then retrying playback using the new recording.

Following the retry 414 of playback, a decision 416 can determine whether the playback error has been resolved. When the decision 416 determines that the playback error has been resolved, then the resilient playback process 400 can return to repeat the block 406 and subsequent blocks so the identified recording can continue to be played back. Alternatively, when the decision 416 determines that the playback error has not been resolved, the resilient playback process 400 is unable to complete the playback of the identified recording. Hence, in this case, the resilient playback process 400 reports 418 that an unresolved error occurred during playback. Following the block 418, the resilient playback process can end.

Figure 5:
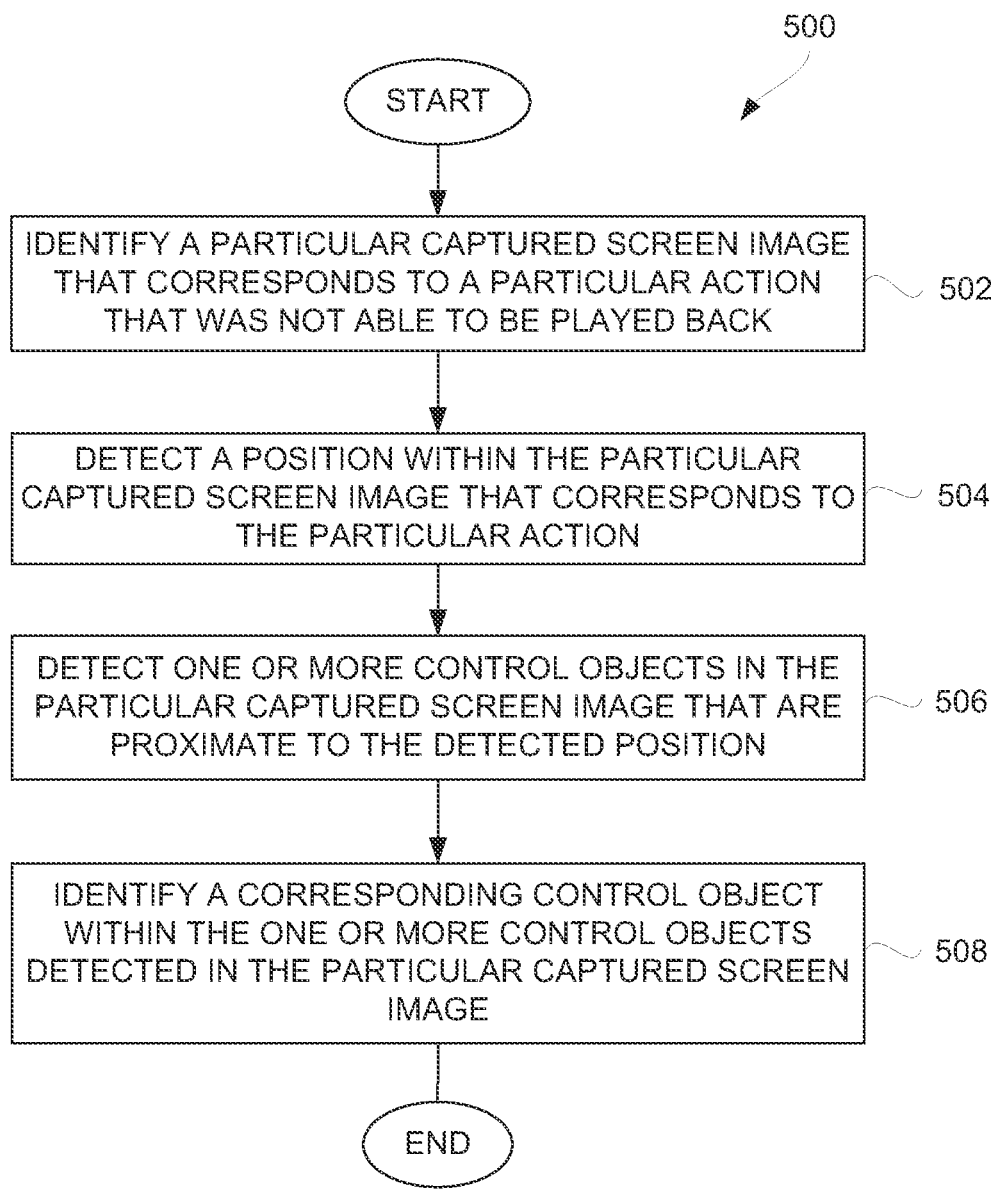
FIG. 5 is a flow diagram of an image-based playback correction process according to one embodiment.

FIG. 5 is a flow diagram of an image-based playback correction process 500 according to one embodiment. The image-based playback correction process 500 is, for example, processing performed by the playback error correction attempted 412 in the resilient playback process 400 illustrated in FIG. 4, or the recording playback correction system 312 illustrated in FIG. 3A.

The image-based playback correction process 500 identifies a particular captured screen image that corresponds to a particular action that was not able to be played back. Here, the playback error that has been detected concerns a particular action of the previously established recording that was not able to be performed during playback. In such case, a particular captured screen image that corresponds to the particular action that was not able to be played back can be identified 502. Next, a position within the particular captured screen image that corresponds to the particular action can be detected 504. In one implementation, the position within the particular captured screen image that corresponds to the particular action can be determined by a visual reference (e.g., a highlighted control) provided within the captured screen image. In another implementation, the position within the particular captured screen image that corresponds to the particular action can be determined by detecting changes between a captured screen before the particular action of interest and a captured screen after the particular action of interest.

After the position within the particular captured screen image that corresponds to the particular action has been detected 504, one or more control objects in the particular captured screen image that are proximate to the detected position can be detected 506. Thereafter, a corresponding control object within the one or more control objects detected in the particular captured screen image can be identified 508. Subsequently, the corresponding control object that has been identified 508 can be utilized to identify a control object that should be utilized when playing back the identified recording. This identified control object can serve as additional information, which can be referred to as a correction, that can be utilized when the playback is retried, such as at block 414 of the resilient playback process 400 illustrated in FIG. 4. The identified control object can be used during retry of playback of the identified recording to locate a needed control object such that in many cases the playback error can be overcome and the playback of the identified recording can continue.

Figure 6A:
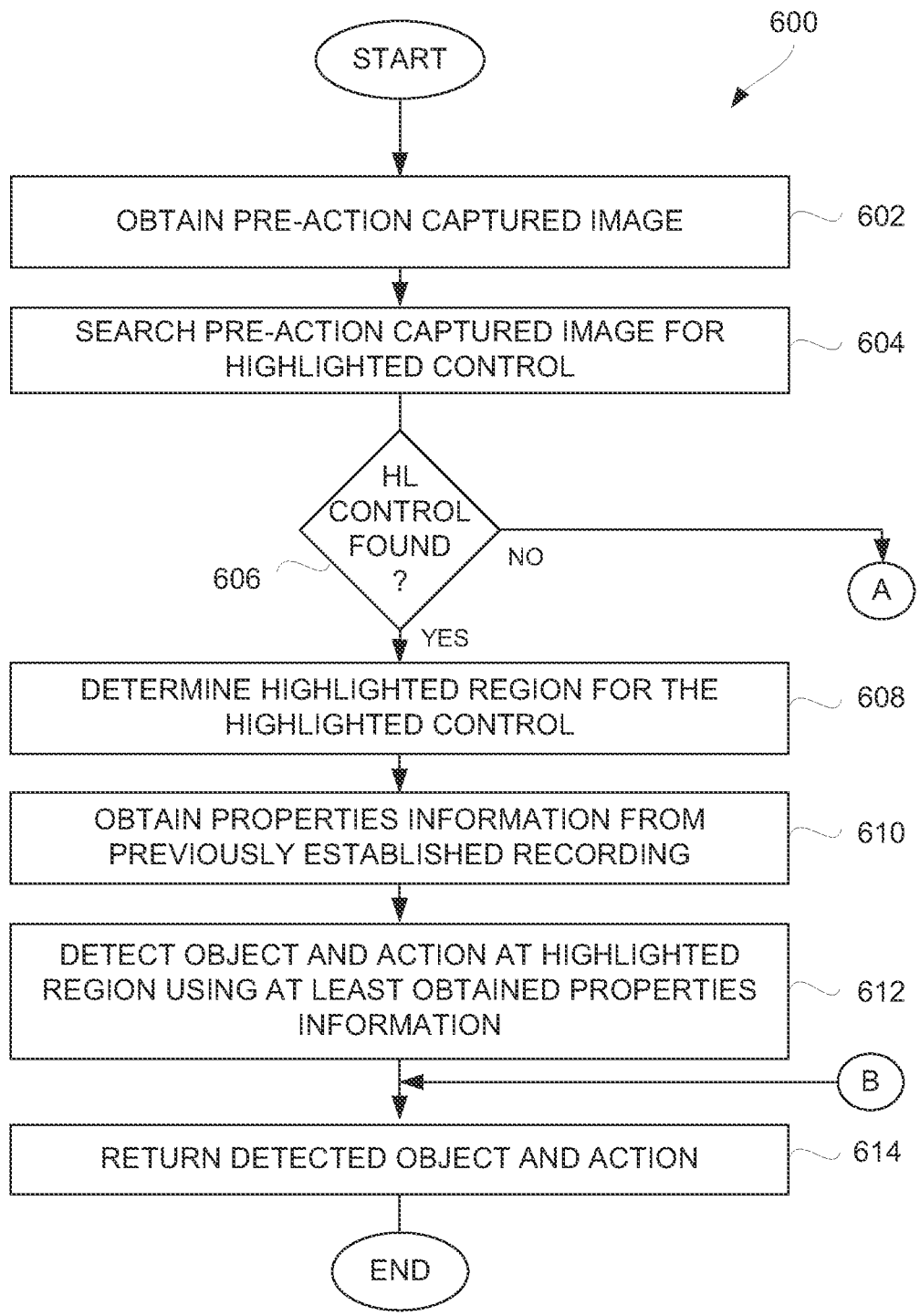
FIGS. 6A and 6B are flow diagrams of a playback error correction process according to one embodiment.
Figure 6B:
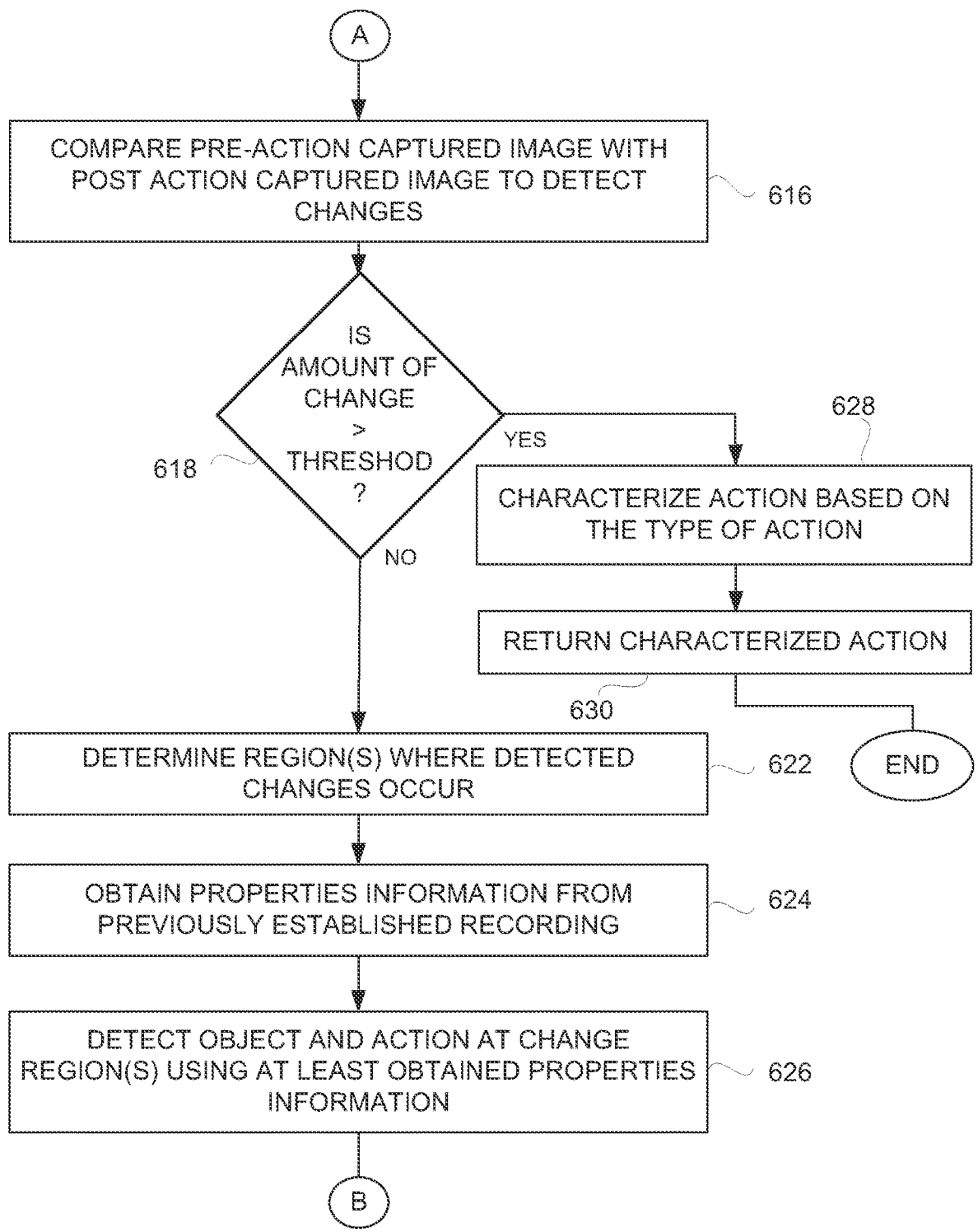

FIGS. 6A and 6B are flow diagrams of a playback error correction process 600 according to one embodiment. The playback error correction process 600 is, for example, processing carried out by the playback error correction attempted 412 by the resilient playback process 400 illustrated in FIG. 4, or the recording playback correction system 312 illustrated in FIG. 3A.

The playback error correction process 600 can obtain 602 a pre-action captured image. The playback error to be corrected is associated with a particular action of a recording that is being played back. The recording is made by a recorder, which can be a recording playback engine (e.g., recording playback engines 302, 316). The pre-action captured image that is obtained 602 can be a previously captured screen image by the recorder prior to the particular action where the playback error occurred. Typically, the pre-action captured image is the screen image captured by the recorder immediately prior to occurrence of the particular action. The pre-action captured image can be searched 604 for a highlighted control, as in some cases a recorder may have denoted a highlighted control which would denote the particular action.

A decision 606 can then determine whether a highlighted control has been found. When the decision 606 determines that a highlighted control has been found, then a highlighted region for the highlighted control can be determined 608. In one implementation, the highlighted region can be determined 608 as a bounding box about the highlighted control. Next, properties information associated with the particular action can be obtained 610 from the previously established recording. In one implementation, the previously established recording provides not only the recording of a series of interactions with one or more software programs but also captured screen images as well as related properties information (e.g., previously established recording 304 illustrated in FIG. 3A). Thereafter, an object and an action can be detected 612 within the pre-action captured image at the highlighted region using at least the obtained properties information. The detected object and action can then be returned 614. Once the detected object and action are returned 614, the playback can be retried with the detected object and action supporting correction of the playback error.

If the decision 606 determines that a highlighted control has not been found, then the playback error correction process 600 proceeds to FIG. 6B and compares 616 the pre-action captured image with a post-action captured image to detect changes. Typically, the post-action captured image is the screen image captured by the recorder immediately after occurrence of the particular action. A decision 618 can then compare the amount of change with a threshold amount. When the amount of change between the pre-action captured image and the post-action captured image is below the threshold amount, then the playback error correction process 600 determines 622 one or more regions where the detected changes occur between the pre-action captured image and the post-action captured image. Additionally, properties information associated with the particular action can be obtained 624 from the previously established recording. As previously noted, in one implementation, the previously established recording provides not only the recording of a series of interactions with one or more software programs but also captured screen images as well as related properties information (e.g., previously established recording 304). Next, an object and action can be detected 626 at the one or more change regions using at least the obtained properties information. Following the block 626, the playback error correction process 600 can continue to block 614 of FIG. 6A where the detected object and action can be returned.

Alternatively, when the decision 618 determines that the amount of change between the pre-action captured image and the post-action captured image exceeds the threshold amount, then an action can be characterized 628 based on the type of action. Here, the change between the pre-action captured image and the post-action captured image is a major change, and thus, for example, can be characterized as a new page, a pop-up window, a next page, and the like. After the action has been characterized, the characterized action can be returned 630 to the RPA system for further processing. Following the block 630, the playback error correction process 600 can end.

Figure 7A:
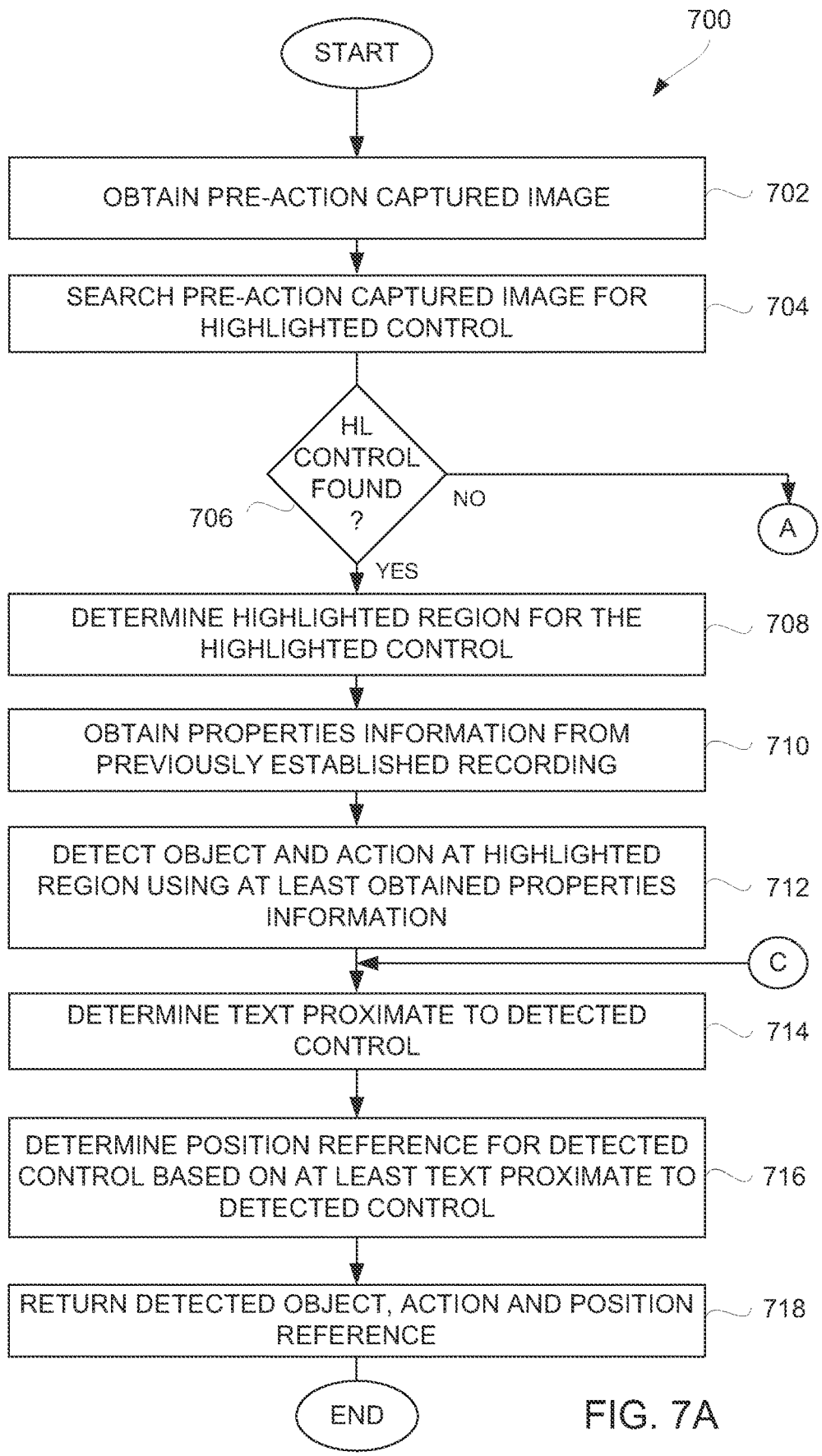
FIGS. 7A-7C are flow diagrams of a playback error correction process according to one embodiment.
Figure 7B:
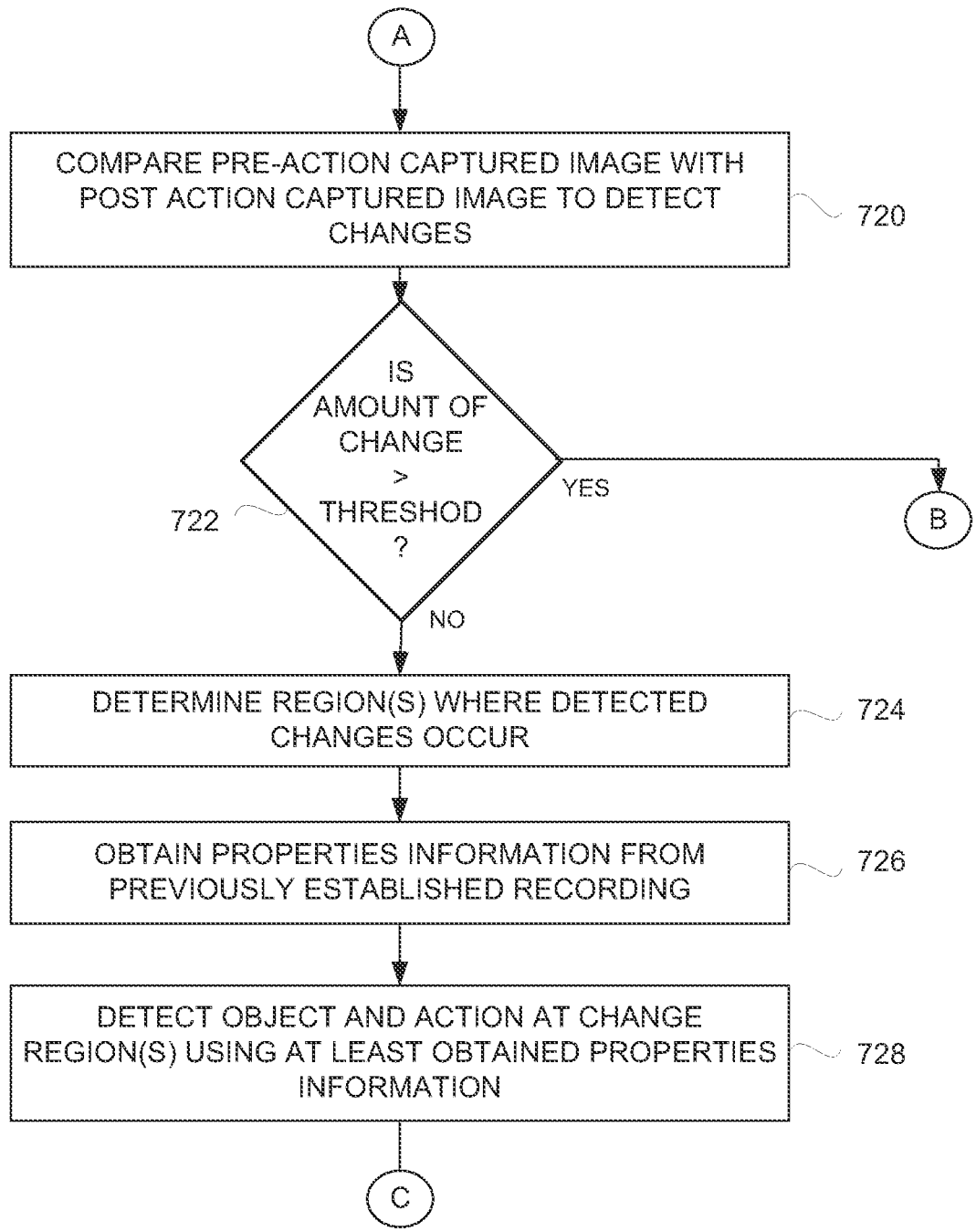
Figure 7C:
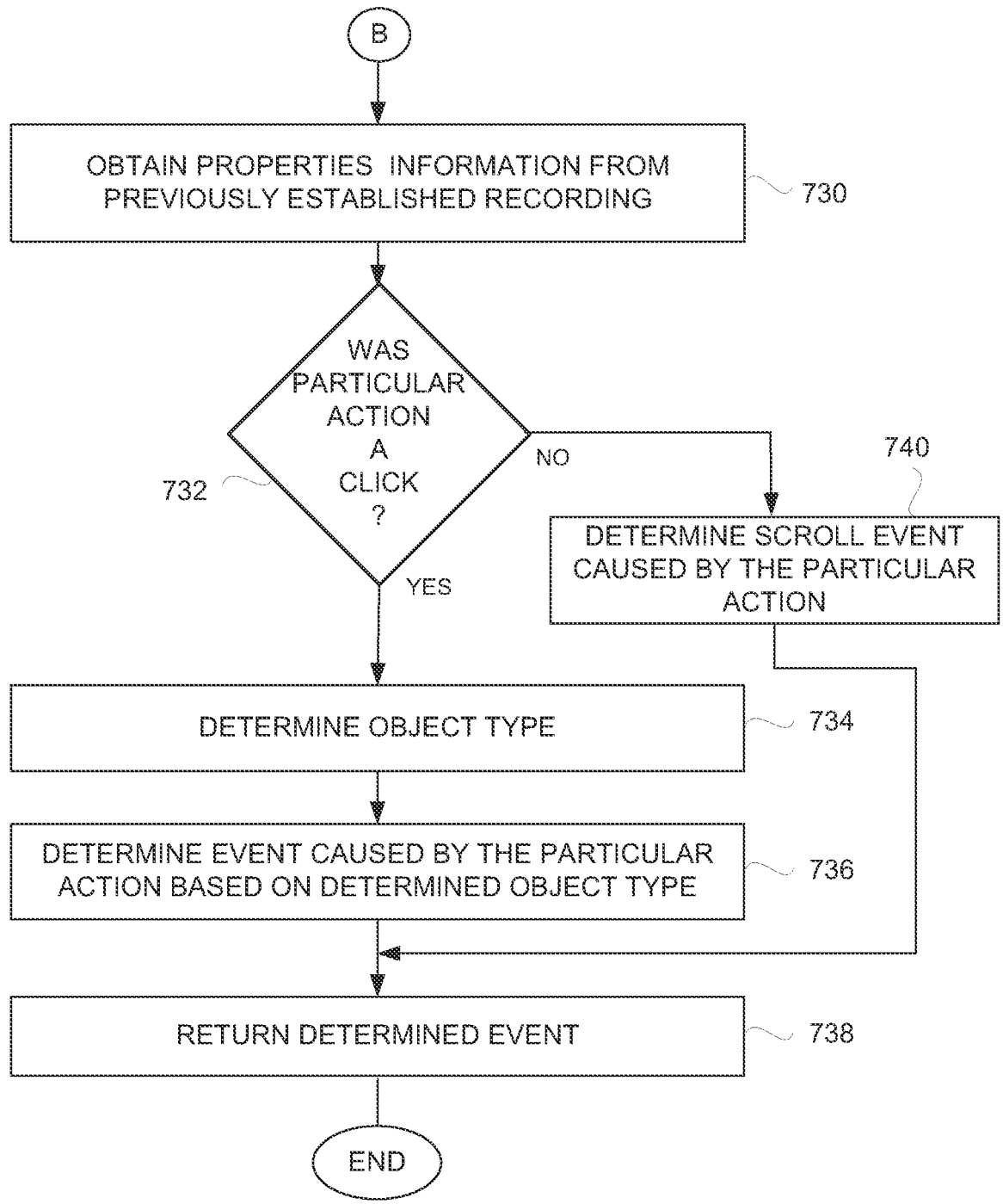

FIGS. 7A-7C are flow diagrams of a playback error correction process 700 according to one embodiment. The playback error correction process 700 is, for example, processing carried out by the playback error correction attempted 412 by the resilient playback process 400 illustrated in FIG. 4, or the recording playback correction system 312 illustrated in FIG. 3A.

The playback error correction process 700 can obtain 702 a pre-action captured image. The playback error to be corrected is associated with a particular action of a recording that is being played back. The recording is made by a recorder, which can be a recording playback engine (e.g., recording playback engine 302). The pre-action captured image that is obtained 702 can be a previously captured screen image by the recorder prior to the particular action where the playback error occurred. Typically, the pre-action captured image is the screen image captured by the recorded immediately prior to occurrence of the particular action. The pre-action captured image can be searched 704 for a highlighted control, as in some cases a recorder may have denoted a highlighted control which would denote the particular action.

A decision 706 can then determine whether a highlighted control has been found. When the decision 706 determines that a highlighted control has been found, then a highlighted region for the highlighted control can be determined 708. In one implementation, the highlighted region can be determined 708 as a bounding box about the highlighted control.

Next, properties information associated with the particular action can be obtained 710 from the previously established recording. In one implementation, the previously established recording provides not only the recording of a series of interactions with one or more software programs but also captured screen images as well as related properties information (e.g., previously established recording 304). Thereafter, an object and an action can be detected 712 within the pre-action captured image at the highlighted region using at least the obtained properties information.

Additionally, the playback error correction process 700 can determine 714 text within the pre-action captured image that is proximate to the detected control. Then, a position reference for the detected control can be determined 716 based on at least text proximate to the detected control. Here, the position reference can be determined 716 from text present within the pre-action captured image. The position reference can be used later when attempting to retry playback after error correction. Typically, the retry of playback would be of a new or upgraded recording that can be executed by an image-base playback recording engine (e.g., second recording payback engine 316) that is compatible with a newly generated recording. Additional details on text detection and use thereof for detecting controls are provided in U.S. Patent Provisional Application No. 63/060,541, filed Aug. 3, 2020, and entitled "ROBOTIC PROCESS AUTOMATION WITH RESILENT PLAYBACK CAPABILITIES," which is hereby incorporated herein by reference for all purposes.

After the position reference has been determined, the detected object, action and position reference can then be returned 718 to the RPA system for further processing. Once the detected object, action and position reference are returned 718, the playback can be retried with the detected object, action and position reference supporting correction of the playback error.

On the other hand, when the decision 706 determines that a highlighted control has not been found, then the playback error correction process 700 proceeds to FIG. 7B to compare 720 the pre-action captured image with a post-action captured image to detect changes. Typically, the post-action captured image is the screen image captured by the recorder immediately after occurrence of the particular action. A decision 722 can then compare the amount of change with a threshold amount. When the amount of change between the pre-action captured image and the post-action captured image is below the threshold amount, then the playback error correction process 700 determines 724 one or more regions where the detected changes occur between the pre-action captured image and the post-action captured image. Additionally, properties information associated with the particular action can be obtained 726 from the previously established recording. As previously noted, in one implementation, the previously established recording provides not only the recording of a series of interactions with one or more software programs but also captured screen images as well as related properties information (e.g., previously established recording 304). Next, an object and action can be detected 728 at the one or more change regions using at least the obtained properties information. Following the block 728, the playback error correction process 700 can continue to block 714 of FIG. 7A where the detected object and action can be returned.

Alternatively, when the decision 722 determines that the amount of change between the pre-action captured image and the post-action captured image exceeds the threshold amount, then properties information associated with the particular action can be obtained 730 from the previously established recording as illustrated in FIG. 7C. As previously noted, in one implementation, the previously established recording provides not only the recording of a series of interactions with one or more software programs but also captured screen images as well as related properties information (e.g., previously established recording 304).

A decision 732 can then determine whether the particular action was a "click". Typically, this determination can be determined from the properties information, which normally includes an object type and an action thereon. When the decision 732 determines that the particular action was a "click" action, then an object type can be determined 734. In one implementation, the object type can be determined from the properties information for the particular action that was obtained 730 from the previously established recording. Next, an event caused by the particular action is determined 736 based on the determined object type. For example, if the determined object type is a combobox, image button or text button, then the event can respectively be considered an expanded window with a list or list box, a pop-up window, or a next window or page in the user interface flow. In some case, further evaluation can determine which of such events best corresponds to the determined object type. In one implementation, text within the captured screen image proximate to the determined object type can be recognized and then used to assist in the event selection. For example, if the determined object type is a button and the recognized text is "Next", then the event can be considered to be a next page event. After the event has been determined 736, the determined event can be returned to XX. Following the block 738, the playback error correction process 700 can end.

On the other hand, when the decision 732 determines that the particular action was not a "click" action, then a scroll event that caused the particular action can be determined 740. Here, it is estimated that a scroll event caused the particular action. While that estimate may be incorrect, it is used for playback to make such as estimate, particularly when a newly generated recording is being formed. In an alternative embodiment, it could be determined that no event occurred. After the event has been determined 740, the determined event can be returned and then the playback error correction process 700 can end.

The various aspects disclosed herein can be utilized with or by robotic process automation systems. Exemplary robotic process automation systems and operations thereof are detailed below.

Figure 8:
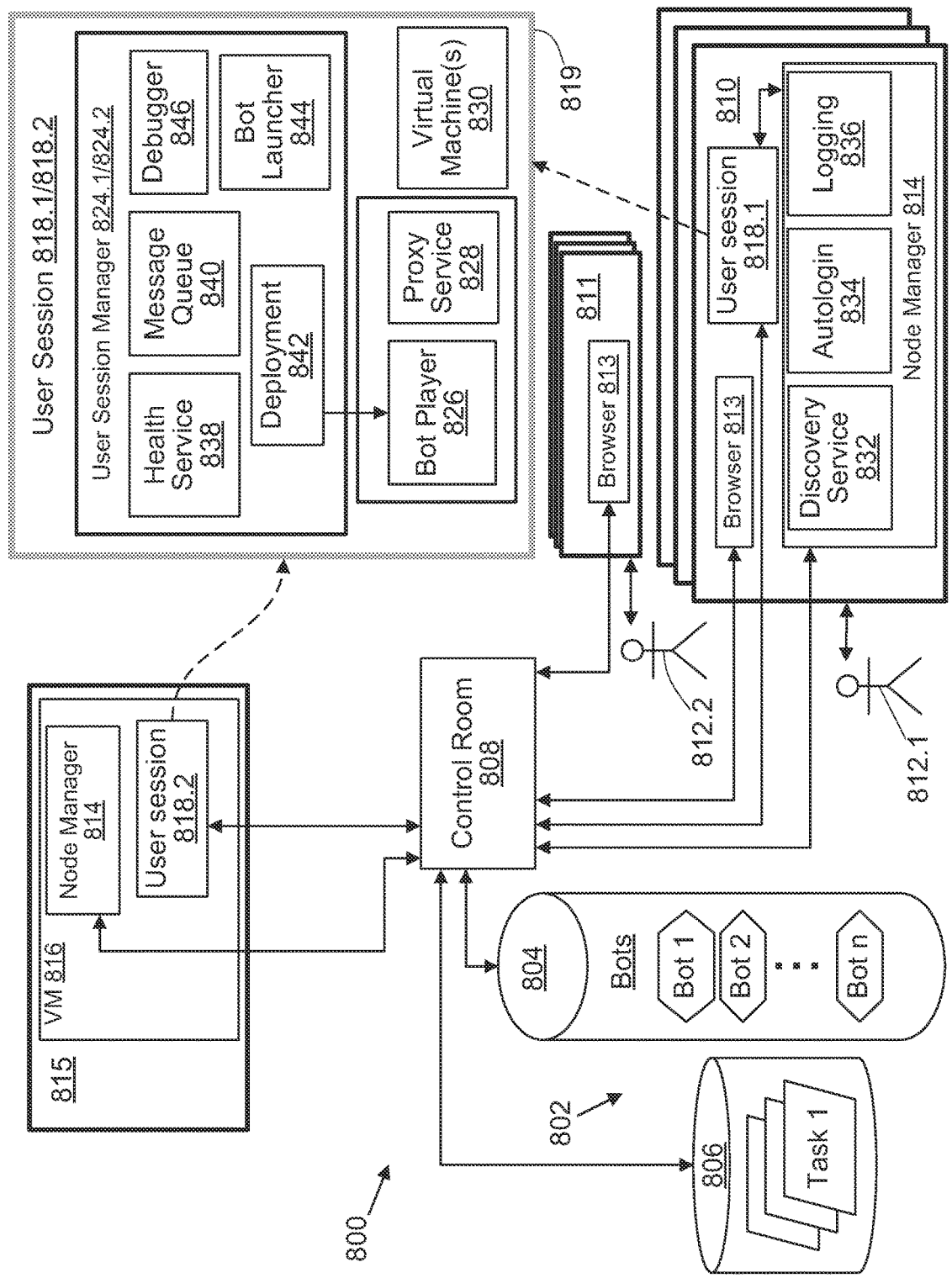
FIG. 8 is a block diagram of a robotic process automation system according to one embodiment.

FIG. 8 is a block diagram of a robotic process automation (RPA) system 800 according to one embodiment. The RPA system 800 includes data storage 802. The data storage 802 can store a plurality of software robots 804, also referred to as bots (e.g., Bot 1, Bot 2, . . . , Bot n). The software robots 804 can be operable to interact at a user level with one or more user level application programs (not shown). As used herein, the term "bot" is generally synonymous with the term software robot. In certain contexts, as will be apparent to those skilled in the art in view of the present disclosure, the term "bot runner" refers to a device (virtual or physical), having the necessary software capability (such as bot player 826), on which a bot will execute or is executing. The data storage 802 can also stores a plurality of work items 806. Each work item 806 can pertain to processing executed by one or more of the software robots 804.

The RPA system 800 can also include a control room 808. The control room 808 is operatively coupled to the data storage 802 and is configured to execute instructions that, when executed, cause the RPA system 800 to respond to a request from a client device 810 that is issued by a user 812.1. The control room 808 can act as a server to provide to the client device 810 the capability to perform an automation task to process a work item from the plurality of work items 806. The RPA system 800 is able to support multiple client devices 810 concurrently, each of which will have one or more corresponding user session(s) 818, which provides a context. The context can, for example, include security, permissions, audit trails, etc. to define the permissions and roles for bots operating under the user session 818. For example, a bot executing under a user session, cannot access any files or use any applications that the user, under whose credentials the bot is operating, does not have permission to do so. This prevents any inadvertent or malicious acts from a bot under which bot 804 executes.

The control room 808 can provide, to the client device 810, software code to implement a node manager 814. The node manager 814 executes on the client device 810 and provides a user 812 a visual interface via browser 813 to view progress of and to control execution of automation tasks. It should be noted that the node manager 814 can be provided to the client device 810 on demand, when required by the client device 810, to execute a desired automation task. In one embodiment, the node manager 814 may remain on the client device 810 after completion of the requested automation task to avoid the need to download it again. In another embodiment, the node manager 814 may be deleted from the client device 810 after completion of the requested automation task. The node manager 814 can also maintain a connection to the control room 808 to inform the control room 808 that device 810 is available for service by the control room 808, irrespective of whether a live user session 818 exists. When executing a bot 804, the node manager 814 can impersonate the user 812 by employing credentials associated with the user 812.

The control room 808 initiates, on the client device 810, a user session 818 (seen as a specific instantiation 818.1) to perform the automation task. The control room 808 retrieves the set of task processing instructions 804 that correspond to the work item 806. The task processing instructions 804 that correspond to the work item 806 can execute under control of the user session 818.1, on the client device 810. The node manager 814 can provide update data indicative of status of processing of the work item to the control room 808. The control room 808 can terminate the user session 818.1 upon completion of processing of the work item 806. The user session 818.1 is shown in further detail at 819, where an instance 824.1 of user session manager 824 is seen along with a bot player 826, proxy service 828, and one or more virtual machine(s) 830, such as a virtual machine that runs Java® or Python®. The user session manager 824 provides a generic user session context within which a bot 804 executes.

The bots 804 execute on a player, via a computing device, to perform the functions encoded by the bot. Some or all of the bots 804 may in certain embodiments be located remotely from the control room 808. Moreover, the devices 810 and 811, which may be conventional computing devices, such as for example, personal computers, server computers, laptops, tablets and other portable computing devices, may also be located remotely from the control room 808. The devices 810 and 811 may also take the form of virtual computing devices. The bots 804 and the work items 806 are shown in separate containers for purposes of illustration but they may be stored in separate or the same device(s), or across multiple devices. The control room 808 can perform user management functions, source control of the bots 804, along with providing a dashboard that provides analytics and results of the bots 804, performs license management of software required by the bots 804 and manages overall execution and management of scripts, clients, roles, credentials, security, etc. The major functions performed by the control room 808 can include: (i) a dashboard that provides a summary of registered/active users, tasks status, repository details, number of clients connected, number of scripts passed or failed recently, tasks that are scheduled to be executed and those that are in progress; (ii) user/role management—permits creation of different roles, such as bot creator, bot runner, admin, and custom roles, and activation, deactivation and modification of roles; (iii) repository management—to manage all scripts, tasks, workflows and reports etc.; (iv) operations management—permits checking status of tasks in progress and history of all tasks, and permits the administrator to stop/start execution of bots currently executing; (v) audit trail—logs creation of all actions performed in the control room; (vi) task scheduler—permits scheduling tasks which need to be executed on different clients at any particular time; (vii) credential management—permits password management; and (viii) security: management—permits rights management for all user roles. The control room 808 is shown generally for simplicity of explanation. Multiple instances of the control room 808 may be employed where large numbers of bots are deployed to provide for scalability of the RPA system 800.

In the event that a device, such as device 811 (e.g., operated by user 812.2) does not satisfy the minimum processing capability to run a node manager 814, the control room 808 can make use of another device, such as device 815, that has the requisite capability. In such case, a node manager 814 within a Virtual Machine (VM), seen as VM 816, can be resident on the device 815. The node manager 814 operating on the device 815 can communicate with browser 813 on device 811. This approach permits RPA system 800 to operate with devices that may have lower processing capability, such as older laptops, desktops, and portable/mobile devices such as tablets and mobile phones. In certain embodiments the browser 813 may take the form of a mobile application stored on the device 811. The control room 808 can establish a user session 818.2 for the user 812.2 while interacting with the control room 808 and the corresponding user session 818.2 operates as described above for user session 818.1 with user session manager 824 operating on device 810 as discussed above.

In certain embodiments, the user session manager 824 provides five functions. First is a health service 838 that maintains and provides a detailed logging of bot execution including monitoring memory and CPU usage by the bot and other parameters such as number of file handles employed. The bots 804 can employ the health service 838 as a resource to pass logging information to the control room 808. Execution of the bot is separately monitored by the user session manager 824 to track memory, CPU, and other system information. The second function provided by the user session manager 824 is a message queue 840 for exchange of data between bots executed within the same user session 818. The third function is a deployment service (also referred to as a deployment module) 842 that connects to the control room 808 to request execution of a requested bot 804. The deployment service 842 can also ensure that the environment is ready for bot execution, such as by making available dependent libraries. The fourth function is a bot launcher 844 which can read metadata associated with a requested bot 804 and launch an appropriate container and begin execution of the requested bot. The fifth function is a debugger service 846 that can be used to debug bot code.

The bot player 826 can execute, or play back, a sequence of instructions encoded in a bot. The sequence of instructions can, for example, be captured by way of a recorder when a human performs those actions, or alternatively the instructions are explicitly coded into the bot. These instructions enable the bot player 826, to perform the same actions as a human would do in their absence. In one implementation, the instructions can compose of a command (action) followed by set of parameters, for example: Open Browser is a command, and a URL would be the parameter for it to launch a web resource. Proxy service 828 can enable integration of external software or applications with the bot to provide specialized services. For example, an externally hosted artificial intelligence system could enable the bot to understand the meaning of a "sentence."

The user 812.1 can interact with node manager 814 via a conventional browser 813 which employs the node manager 814 to communicate with the control room 808. When the user 812.1 logs in from the client device 810 to the control room 808 for the first time, the user 812.1 can be prompted to download and install the node manager 814 on the device 810, if one is not already present. The node manager 814 can establish a web socket connection to the user session manager 824, deployed by the control room 808 that lets the user 812.1 subsequently create, edit, and deploy the bots 804.

Figure 9:
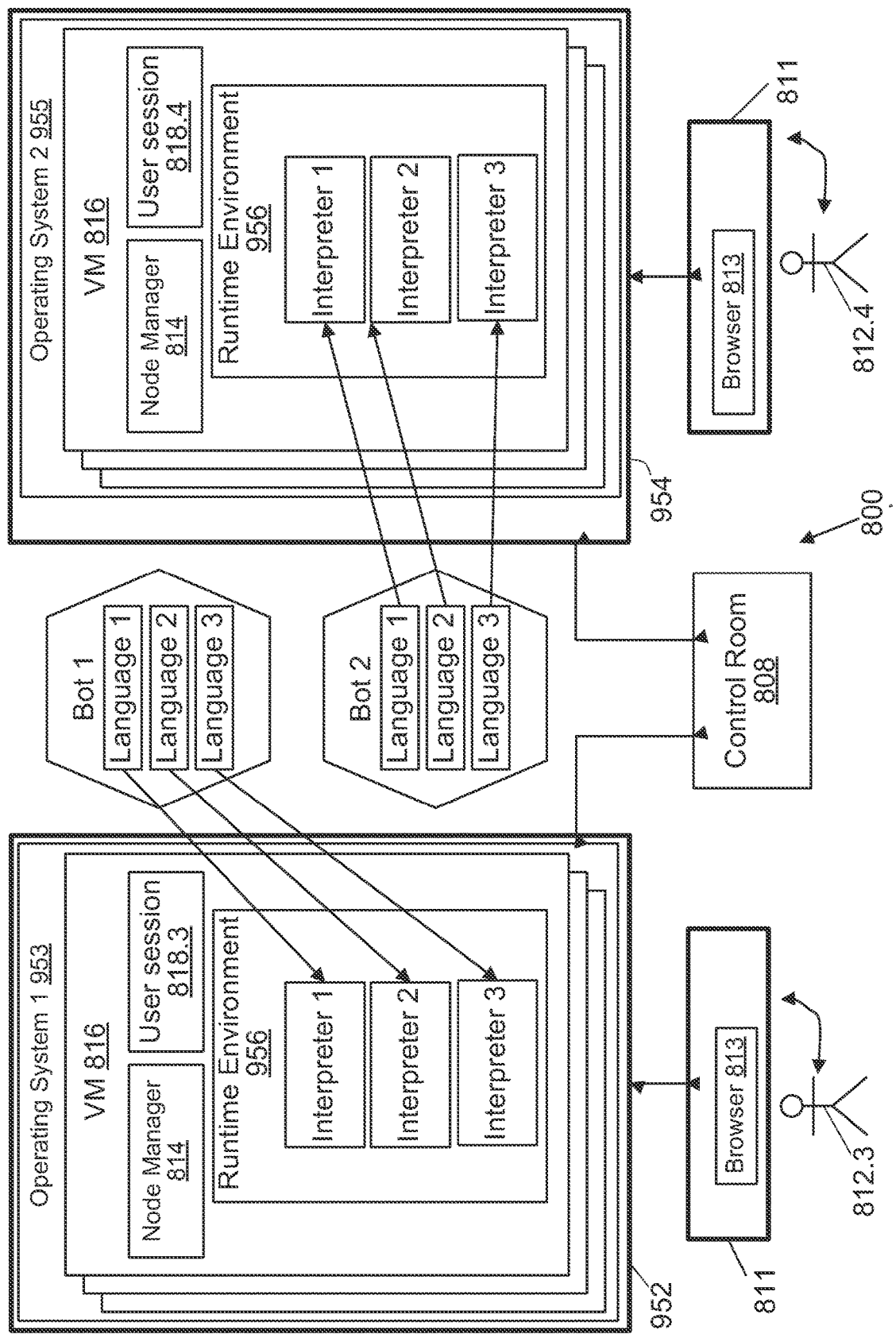
FIG. 9 is a block diagram of a generalized runtime environment for bots in accordance with another embodiment of the robotic process automation system illustrated in FIG. 8.

FIG. 9 is a block diagram of a generalized runtime environment for bots 804 in accordance with another embodiment of the RPA system 800 illustrated in FIG. 8. This flexible runtime environment advantageously permits extensibility of the platform to enable use of various languages in encoding bots. In the embodiment of FIG. 9, RPA system 800 generally operates in the manner described in connection with FIG. 8, except that in the embodiment of FIG. 9, some or all of the user sessions 818 execute within a virtual machine 816. This permits the bots 804 to operate on an RPA system 800 that runs on an operating system different from an operating system on which a bot 804 may have been developed. For example, if a bot 804 is developed on the Windows® operating system, the platform agnostic embodiment shown in FIG. 9 permits the bot 804 to be executed on a device 952 or 954 executing an operating system 953 or 955 different than Windows®, such as, for example, Linux. In one embodiment, the VM 816 takes the form of a Java Virtual Machine (JVM) as provided by Oracle Corporation. As will be understood by those skilled in the art in view of the present disclosure, a JVM enables a computer to run Java® programs as well as programs written in other languages that are also compiled to Java® bytecode.

In the embodiment shown in FIG. 9, multiple devices 952 can execute operating system 1, 953, which may, for example, be a Windows® operating system. Multiple devices 954 can execute operating system 2, 955, which may, for example, be a Linux® operating system. For simplicity of explanation, two different operating systems are shown, by way of example and additional operating systems such as the macOS®, or other operating systems may also be employed on devices 952, 954 or other devices. Each device 952, 954 has installed therein one or more VM's 816, each of which can execute its own operating system (not shown), which may be the same or different than the host operating system 953/955. Each VM 816 has installed, either in advance, or on demand from control room 808, a node manager 814. The embodiment illustrated in FIG. 9 differs from the embodiment shown in FIG. 8 in that the devices 952 and 954 have installed thereon one or more VMs 816 as described above, with each VM 816 having an operating system installed that may or may not be compatible with an operating system required by an automation task. Moreover, each VM has installed thereon a runtime environment 956, each of which has installed thereon one or more interpreters (shown as interpreter 1, interpreter 2, interpreter 3). Three interpreters are shown by way of example but any run time environment 956 may, at any given time, have installed thereupon less than or more than three different interpreters. Each interpreter 956 is specifically encoded to interpret instructions encoded in a particular programming language. For example, interpreter 1 may be encoded to interpret software programs encoded in the Java® programming language, seen in FIG. 9 as language 1 in Bot 1 and Bot 2. Interpreter 2 may be encoded to interpret software programs encoded in the Python® programming language, seen in FIG. 9 as language 2 in Bot 1 and Bot 2, and interpreter 3 may be encoded to interpret software programs encoded in the R programming language, seen in FIG. 9 as language 3 in Bot 1 and Bot 2.

Turning to the bots Bot 1 and Bot 2, each bot may contain instructions encoded in one or more programming languages. In the example shown in FIG. 9, each bot can contain instructions in three different programming languages, for example, Java®, Python® and R. This is for purposes of explanation and the embodiment of FIG. 9 may be able to create and execute bots encoded in more or less than three programming languages. The VMs 816 and the runtime environments 956 permit execution of bots encoded in multiple languages, thereby permitting greater flexibility in encoding bots. Moreover, the VMs 816 permit greater flexibility in bot execution. For example, a bot that is encoded with commands that are specific to an operating system, for example, open a file, or that requires an application that runs on a particular operating system, for example, Excel® on Windows®, can be deployed with much greater flexibility. In such a situation, the control room 808 will select a device with a VM 816 that has the Windows® operating system and the Excel® application installed thereon. Licensing fees can also be reduced by serially using a particular device with the required licensed operating system and application(s), instead of having multiple devices with such an operating system and applications, which may be unused for large periods of time.

Figure 10:
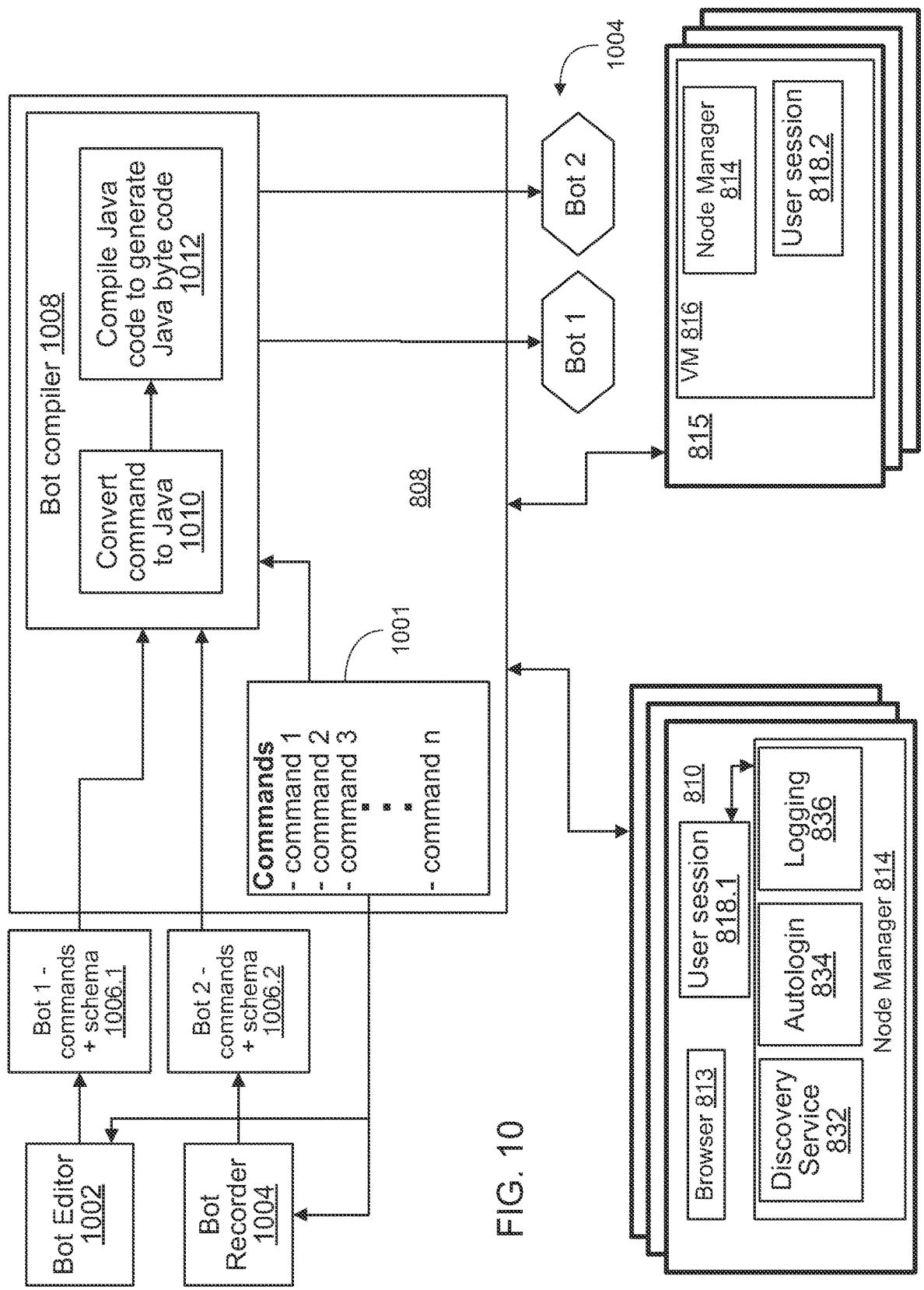
FIG. 10 is yet another embodiment of the robotic process automation system of FIG. 8 configured to provide platform independent sets of task processing instructions for bots.

FIG. 10 illustrates a block diagram of yet another embodiment of the RPA system 800 of FIG. 8 configured to provide platform independent sets of task processing instructions for bots 804. Two bots 804, bot 1 and bot 2 are shown in FIG. 10. Each of bots 1 and 2 are formed from one or more commands 1001, each of which specifies a user level operation with a specified application program, or a user level operation provided by an operating system. Sets of commands 1006.1 and 1006.2 may be generated by bot editor 1002 and bot recorder 1004, respectively, to define sequences of application level operations that are normally performed by a human user. The bot editor 1002 may be configured to combine sequences of commands 1001 via an editor. The bot recorder 1004 may be configured to record application level operations performed by a user and to convert the operations performed by the user to commands 1001. The sets of commands 1006.1 and 1006.2 generated by the editor 1002 and the recorder 1004 can include command(s) and schema for the command(s), where the schema defines the format of the command(s). The format of a command can, such as, includes the input(s) expected by the command and their format. For example, a command to open a URL might include the URL, a user login, and a password to login to an application resident at the designated URL.

The control room 808 operates to compile, via compiler 1008, the sets of commands generated by the editor 1002 or the recorder 1004 into platform independent executables, each of which is also referred to herein as a bot JAR (Java ARchive) that perform application level operations captured by the bot editor 1002 and the bot recorder 1004. In the embodiment illustrated in FIG. 10, the set of commands 1006, representing a bot file, can be captured in a JSON (JavaScript Object Notation) format which is a lightweight data-interchange text-based format. JSON is based on a subset of the JavaScript Programming Language Standard ECMA-262 3rd Edition—December 1999. JSON is built on two structures: (i) a collection of name/value pairs; in various languages, this is realized as an object, record, struct, dictionary, hash table, keyed list, or associative array, (ii) an ordered list of values which, in most languages, is realized as an array, vector, list, or sequence. Bots 1 and 2 may be executed on devices 810 and/or 815 to perform the encoded application level operations that are normally performed by a human user.

Figure 11:
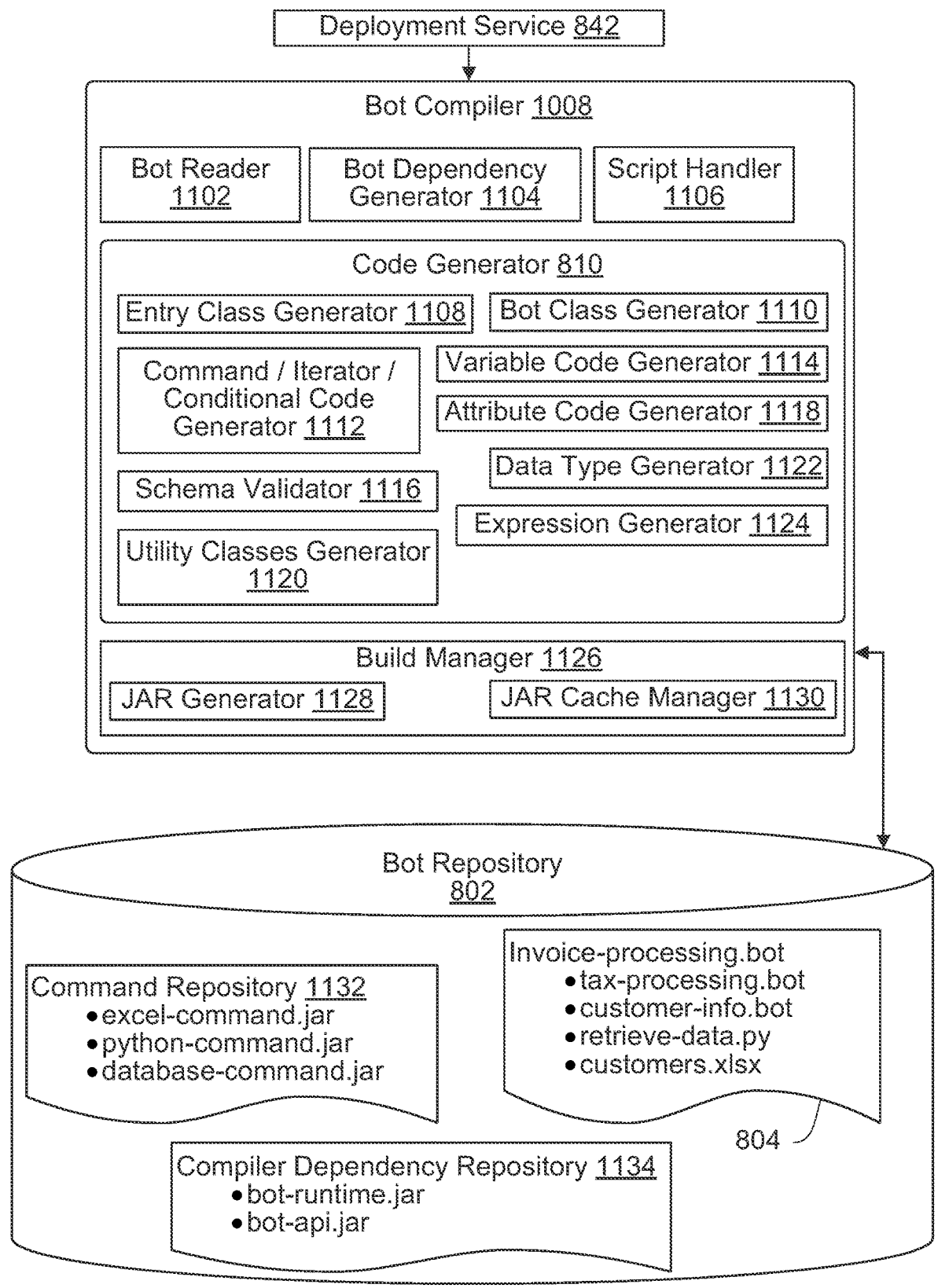
FIG. 11 is a block diagram illustrating details of one embodiment of the bot compiler illustrated in FIG. 10.

FIG. 11 is a block diagram illustrating details of one embodiment of the bot compiler 1008 illustrated in FIG. 10. The bot compiler 1008 accesses one or more of the bots 804 from the data storage 802, which can serve as bot repository, along with commands 1001 that are contained in a command repository 1132. The bot compiler 808 can also access compiler dependency repository 1134. The bot compiler 808 can operate to convert each command 1001 via code generator module 1010 to an operating system independent format, such as a Java command. The bot compiler 808 then compiles each operating system independent format command into byte code, such as Java byte code, to create a bot JAR. The convert command to Java module 1010 is shown in further detail in in FIG. 11 by JAR generator 1128 of a build manager 1126. The compiling to generate Java byte code module 1012 can be provided by the JAR generator 1128. In one embodiment, a conventional Java compiler, such as javac from Oracle Corporation, may be employed to generate the bot JAR (artifacts). As will be appreciated by those skilled in the art, an artifact in a Java environment includes compiled code along with other dependencies and resources required by the compiled code. Such dependencies can include libraries specified in the code and other artifacts. Resources can include web pages, images, descriptor files, other files, directories and archives.

As noted in connection with FIG. 10, deployment service 842 can be responsible to trigger the process of bot compilation and then once a bot has compiled successfully, to execute the resulting bot JAR on selected devices 810 and/or 815. The bot compiler 1008 can comprises a number of functional modules that, when combined, generate a bot 804 in a JAR format. A bot reader 1102 loads a bot file into memory with class representation. The bot reader 1102 takes as input a bot file and generates an in-memory bot structure. A bot dependency generator 1104 identifies and creates a dependency graph for a given bot. It includes any child bot, resource file like script, and document or image used while creating a bot. The bot dependency generator 1104 takes, as input, the output of the bot reader 1102 and provides, as output, a list of direct and transitive bot dependencies. A script handler 1106 handles script execution by injecting a contract into a user script file. The script handler 1106 registers an external script in manifest and bundles the script as a resource in an output JAR. The script handler 1106 takes, as input, the output of the bot reader 1102 and provides, as output, a list of function pointers to execute different types of identified scripts like Python, Java, VB scripts.

An entry class generator 1108 can create a Java class with an entry method, to permit bot execution to be started from that point. For example, the entry class generator 1108 takes, as an input, a parent bot name, such "Invoice-processing-.bot" and generates a Java class having a contract method with a predefined signature. A bot class generator 1110 can generate a bot class and orders command code in sequence of execution. The bot class generator 1110 can take, as input, an in-memory bot structure and generates, as output, a Java class in a predefined structure. A Command/Iterator/Conditional Code Generator 1112 wires up a command class with singleton object creation, manages nested command linking, iterator (loop) generation, and conditional (If/Else If/Else) construct generation. The Command/Iterator/Conditional Code Generator 1112 can take, as input, an in-memory bot structure in JSON format and generates Java code within the bot class. A variable code generator 1114 generates code for user defined variables in the bot, maps bot level data types to Java language compatible types, and assigns initial values provided by user. The variable code generator 1114 takes, as input, an in-memory bot structure and generates Java code within the bot class. A schema validator 1116 can validate user inputs based on command schema and includes syntax and semantic checks on user provided values. The schema validator 1116 can take, as input, an in-memory bot structure and generates validation errors that it detects. The attribute code generator 1118 can generate attribute code, handles the nested nature of attributes, and transforms bot value types to Java language compatible types. The attribute code generator 1118 takes, as input, an in-memory bot structure and generates Java code within the bot class. A utility classes generator 1120 can generate utility classes which are used by an entry class or bot class methods. The utility classes generator 1120 can generate, as output, Java classes. A data type generator 1122 can generate value types useful at runtime. The data type generator 1122 can generate, as output, Java classes. An expression generator 1124 can evaluate user inputs and generates compatible Java code, identifies complex variable mixed user inputs, inject variable values, and transform mathematical expressions. The expression generator 1124 can take, as input, user defined values and generates, as output, Java compatible expressions.

The JAR generator 1128 can compile Java source files, produces byte code and packs everything in a single JAR, including other child bots and file dependencies. The JAR generator 1128 can take, as input, generated Java files, resource files used during the bot creation, bot compiler dependencies, and command packages, and then can generate a JAR artifact as an output. The JAR cache manager 1130 can put a bot JAR in cache repository so that recompilation can be avoided if the bot has not been modified since the last cache entry. The JAR cache manager 1130 can take, as input, a bot JAR.

In one or more embodiment described herein command action logic can be implemented by commands 1001 available at the control room 808. This permits the execution environment on a device 810 and/or 815, such as exists in a user session 818, to be agnostic to changes in the command action logic implemented by a bot 804. In other words, the manner in which a command implemented by a bot 804 operates need not be visible to the execution environment in which a bot 804 operates. The execution environment is able to be independent of the command action logic of any commands implemented by bots 804. The result is that changes in any commands 1001 supported by the RPA system 800, or addition of new commands 1001 to the RPA system 800, do not require an update of the execution environment on devices 810, 815. This avoids what can be a time and resource intensive process in which addition of a new command 1001 or change to any command 1001 requires an update to the execution environment to each device 810, 815 employed in a RPA system. Take, for example, a bot that employs a command 1001 that logs into an on-online service. The command 1001 upon execution takes a Uniform Resource Locator (URL), opens (or selects) a browser, retrieves credentials corresponding to a user on behalf of whom the bot is logging in as, and enters the user credentials (e.g., username and password) as specified. If the command 1001 is changed, for example, to perform two-factor authentication, then it will require an additional resource (the second factor for authentication) and will perform additional actions beyond those performed by the original command (for example, logging into an email account to retrieve the second factor and entering the second factor). The command action logic will have changed as the bot is required to perform the additional changes. Any bot(s) that employ the changed command will need to be recompiled to generate a new bot JAR for each changed bot and the new bot JAR will need to be provided to a bot runner upon request by the bot runner. The execution environment on the device that is requesting the updated bot will not need to be updated as the command action logic of the changed command is reflected in the new bot JAR containing the byte code to be executed by the execution environment.

The embodiments herein can be implemented in the general context of computer-executable instructions, such as those included in program modules, being executed in a computing system on a target, real or virtual, processor. Generally, program modules include routines, programs, libraries, objects, classes, components, data structures, etc. that perform particular tasks or implement particular abstract data types. The program modules may be obtained from another computer system, such as via the Internet, by downloading the program modules from the other computer system for execution on one or more different computer systems. The functionality of the program modules may be combined or split between program modules as desired in various embodiments. Computer-executable instructions for program modules may be executed within a local or distributed computing system. The computer-executable instructions, which may include data, instructions, and configuration parameters, may be provided via an article of manufacture including a computer readable medium, which provides content that represents instructions that can be executed. A computer readable medium may also include a storage or database from which content can be downloaded. A computer readable medium may further include a device or product having content stored thereon at a time of sale or delivery. Thus, delivering a device with stored content, or offering content for download over a communication medium, may be understood as providing an article of manufacture with such content described herein.

Figure 12:
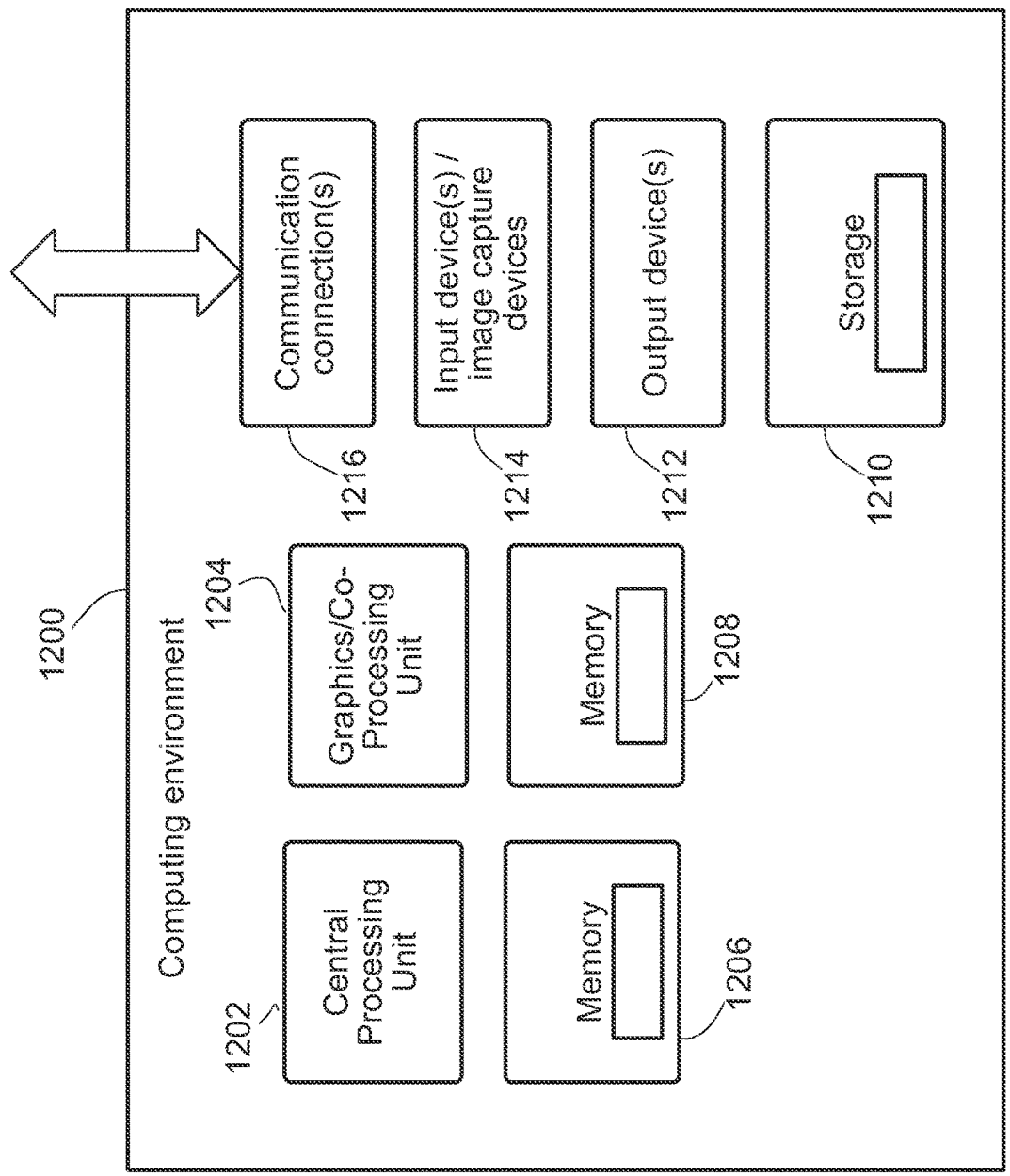
FIG. 12 is a block diagram of an exemplary computing environment for an implementation of a robotic process automation system.

FIG. 12 illustrates a block diagram of an exemplary computing environment 1200 for an implementation of an RPA system, such as the RPA systems disclosed herein. The embodiments described herein may be implemented using the exemplary computing environment 1200. The exemplary computing environment 1200 includes one or more processing units 1202, 1204 and memory 1206, 1208. The processing units 1202, 1206 execute computer-executable instructions. Each of the processing units 1202, 1206 can be a general-purpose central processing unit (CPU), processor in an application-specific integrated circuit (ASIC) or any other type of processor. For example, as shown in FIG. 12, the processing unit 1202 can be a CPU, and the processing unit can be a graphics/co-processing unit (GPU). The tangible memory 1206, 1208 may be volatile memory (e.g., registers, cache, RAM), non-volatile memory (e.g., ROM, EEPROM, flash memory, etc.), or some combination of the two, accessible by the processing unit(s). The hardware components may be standard hardware components, or alternatively, some embodiments may employ specialized hardware components to further increase the operating efficiency and speed with which the RPA system operates. The various components of exemplary computing environment 1200 may be rearranged in various embodiments, and some embodiments may not require nor include all of the above components, while other embodiments may include additional components, such as specialized processors and additional memory.

The exemplary computing environment 1200 may have additional features such as, for example, tangible storage 1210, one or more input devices 1214, one or more output devices 1212, and one or more communication connections 1216. An interconnection mechanism (not shown) such as a bus, controller, or network can interconnect the various components of the exemplary computing environment 1200. Typically, operating system software (not shown) provides an operating system for other software executing in the exemplary computing environment 1200, and coordinates activities of the various components of the exemplary computing environment 1200.

The tangible storage 1210 may be removable or non-removable, and includes magnetic disks, magnetic tapes or cassettes, CD-ROMs, DVDs, or any other medium which can be used to store information in a non-transitory way, and which can be accessed within the computing system 1200. The tangible storage 1210 can store instructions for the software implementing one or more features of a PRA system as described herein.

The input device(s) or image capture device(s) 1214 may include, for example, one or more of a touch input device (such as a keyboard, mouse, pen, or trackball), a voice input device, a scanning device, an imaging sensor, touch surface, or any other device capable of providing input to the exemplary computing environment 1200. For multimedia embodiment, the input device(s) 1214 can, for example, include a camera, a video card, a TV tuner card, or similar device that accepts video input in analog or digital form, a microphone, an audio card, or a CD-ROM or CD-RW that reads audio/video samples into the exemplary computing environment 1200. The output device(s) 1212 can, for example, include a display, a printer, a speaker, a CD-writer, or any another device that provides output from the exemplary computing environment 1200.

The one or more communication connections 1216 can enable communication over a communication medium to another computing entity. The communication medium conveys information such as computer-executable instructions, audio or video input or output, or other data. The communication medium can include a wireless medium, a wired medium, or a combination thereof.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. In one embodiment, the computer readable medium is non-transitory. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method for playing back a previously established recording having a plurality of recorded actions undertaken with respect to one or more software programs, the method comprising:
    initiating playback of the previously established recording, the previously established recording including at least properties and previously captured screen images for one or more of the recorded actions within the recording, the previously captured screen images are screen images captured at the time of the recording of the previously established recording;
    determining if an error occurred during playback of a particular action of the previously established recording; and
    resolving the error that occurred during playback of the particular action of the previously established recording, the resolving including at least:
        identifying a pre-action captured screen image of the previously captured screen images that corresponds to a screen image occurring just prior to the particular action;
        identifying a post-action captured screen image of the previously captured screen images that corresponds to a screen image occurring just after the particular action;
        determining an amount of change between the pre-action captured screen image and the post-action captured screen image;
        comparing the amount of change with a threshold amount to determining type of processing to be performed to resolve the error that occurred during execution of the previously established recording;
        resolving the particular action associated with the error using a first type of processing technique if the comparing determines that the amount of change is greater than the threshold amount; and
        resolving the particular action associated with the error using a second type of processing technique if the comparing determines that the amount of change is less than the threshold amount,
    wherein the second type of processing technique includes at least:
        identifying a particular captured screen image of the previously captured screen images that corresponds to the particular action;
        detecting a position in the particular captured screen image that is associated with the particular action;
        detecting one or more control objects in the particular captured screen image that are proximate to the position detected in the particular captured screen image;
        identifying a corresponding control object within the one or more control objects detected in the particular captured screen image that corresponds to the particular action; and
        facilitating playback of the particular action using the corresponding control object that has been identified.

2. A computer-implemented method as recited in claim 1, wherein the facilitating playback comprises;
    retrying playback of the particular action using at least a portion of the previously established recording and at least one property of the corresponding control object that has been identified.

3. A computer-implemented method as recited in claim 1, wherein the facilitating playback comprises:
    augmenting the previously established recording based on at least the corresponding object; and
    retrying playback of the particular action using the previously established recording that has been augmented.

4. A computer-implemented method as recited in claim 1, wherein the facilitating playback comprises:
    forming a new recording from at least the previously established recording and the corresponding object.

5. A computer-implemented method as recited in claim 1, wherein the facilitating playback comprises:
    forming a new recording from at least the previously established recording and the corresponding object; and
    retrying playback of the particular action using the new recording.

6. A computer-implemented method as recited in claim 1, wherein the identifying of the particular captured screen image comprises:
    identifying a first captured screen image and a second captured screen image from the previously captured screen images that correspond to the particular action, and
    wherein the detecting a position in the particular captured screen image that is associated with the particular action comprises:
    comparing the first and second captured screen images to determine one or more change regions.

7. A computer-implemented method as recited in claim 1, wherein the first type of processing technique includes at least:
    characterizing the particular action associated with the error as a predetermined action, and
    wherein the predetermined action is one of a plurality of predetermined actions, and wherein the predetermined actions include at least a new page action and/or a pop-up window action.

8. A computer-implemented method as recited in claim 1, wherein the detecting a position in the particular captured screen image that is associated with the particular action comprises:
   determining a position of a highlighted object within the particular captured screen image.

9. A computer-implemented method as recited in claim 8, wherein the determining of the position of the highlighted object uses a machine trained object detection model that is trained to locate the highlighted object in the particular capture screen image.

10. A computer-implemented method as recited in claim 9, wherein the machine trained object detection model is trained deep neural network.

11. A computer-implemented method as recited in claim 1, wherein the detecting the one or more control objects in the particular captured screen image that are proximate to the position detected in the particular captured screen image uses a machine trained object detection model that is trained to locate the one or more control objects in the particular capture screen image.

12. A computer-implemented method as recited in claim 11, wherein the machine trained object detection model is trained deep neural network.

13. A computer-implemented method for playing back a previously established recording having a plurality of recorded actions undertaken with respect to one or more software programs, the method comprising:
   initiating execution of the previously established recording, the previously established recording including at least properties and previously captured screen images for one or more of the recorded actions within the recording, the previously captured screen images are screen images captured at the time of the recording of the previously established recording;
   determining if an error occurred during execution of the previously established recording;
   identifying, in response to the determining the error occurred, a particular action of the one or more of the recorded actions within the previously established recording in which the error occurred;
   identifying a pre-action captured screen image of the previously captured screen images that corresponds to a screen image occurring just prior to the particular action;
   identifying a post-action captured screen image of the previously captured screen images that corresponds to a screen image occurring just after the particular action;
   determining an amount of change between the pre-action captured screen image and the post-action captured screen image;
   comparing the amount of change with a threshold amount to determining type of processing to be performed to resolve the error that occurred during execution of the previously established recording;
   resolving the particular action associated with the error using a first type of processing technique if the comparing determines that the amount of change is greater than the threshold amount; and
   resolving the particular action associated with the error using a second type of processing technique if the comparing determines that the amount of change is less than the threshold amount,
   wherein the second type of processing technique includes at least:
      detecting control objects in the particular captured screen image;
      locating a particular control object within the control objects detected in the particular captured screen image based on at least properties of the particular action from the previously established recording; and
      facilitating execution of the particular action using the particular control object.

14. A computer-implemented method as recited in claim 13, wherein the detecting the one or more control objects in the particular captured screen image uses a machine trained object detection model that is trained to locate the one or more control objects in the particular capture screen image.

15. A computer-implemented method as recited in claim 13, wherein the facilitating execution comprises:
   resuming execution of the previously established recording or a replacement recording, wherein the error that occurred is resolved using at least the particular control object.

16. A computer-implemented method as recited in claim 15, wherein the resuming execution comprises:
   invoking the particular control object to affect the particular action.

17. A computer-implemented method as recited in claim 13, wherein the at least properties of the particular action from the previously established recording being used to locate the particular control object within the control objects detected in the particular captured screen image include at least one or control object type.

18. A non-transitory computer readable medium including at least computer program code tangibly stored therein for playing back a previously established recording having a plurality of recorded actions of a robotic process automation system, the computer readable medium comprising:
   computer program code for initiating execution of the previously established recording, the previously established recording including at least properties and previously captured screen images for one or more of the recorded actions within the recording, the previously captured screen images are screen images captured at the time of the recording of the previously established recording;
   computer program code for determining if an error occurred during execution of the previously established recording;
   computer program code for identifying, in response to the determining the error occurred, a particular action of the plurality of recorded actions of the previously established recording in which the error occurred;
   computer program code for identifying a pre-action captured screen image of the previously captured screen images that corresponds to a screen image occurring just prior to the particular action;
   computer program code for identifying a post-action captured screen image of the previously captured screen images that corresponds to a screen image occurring just after the particular action;
   computer program code for determining an amount of change between the pre-action captured screen image and the post-action captured screen image;
   computer program code for comparing the amount of change with a threshold amount to determining type of processing to be performed to resolve the error that occurred during execution of the previously established recording;
   computer program code for resolving the particular action associated with the error using a first type of processing technique if the comparing determines that the amount of change is greater than the threshold amount; and computer program code for resolving the particular action associated with the error using a second type of processing technique if the comparing determines that the amount of change is less than the threshold amount, wherein the second type of processing technique includes at least:

detecting one or more control objects in the particular captured screen image;

identifying a particular control object within the one or more control objects detected in the particular captured screen image based on at least one or more properties of the particular action from the previously established recording; and facilitating execution of the particular action using the particular control object that has been identified.

19. A non-transitory computer readable medium as recited in claim 18, wherein the first type of processing technique includes at least:

characterizing the particular action associated with the error as a predetermined action.

20. A non-transitory computer readable medium as recited in claim 19, wherein the predetermined action is one of a plurality of predetermined actions, and wherein the predetermined actions include at least a new page action and/or a pop-up window action.

* * * * *